[12] United States Patent
Gryglewicz et al.

(10) Patent No.: US 6,993,502 B1
(45) Date of Patent: Jan. 31, 2006

(54) TRANSACTION TAX COLLECTION SYSTEM AND METHOD

(75) Inventors: David Gryglewicz, Denver, CO (US); Michael Blandina, Aurura, CO (US); Douglas L. Birch, Littleton, CO (US)

(73) Assignee: CCH Incorporated, Chicago, IL (US)

( * ) Notice: Subject to any disclaimer, the term of this patent is extended or adjusted under 35 U.S.C. 154(b) by 0 days.

(21) Appl. No.: 09/710,443

(22) Filed: Nov. 10, 2000

Related U.S. Application Data

(60) Provisional application No. 60/164,976, filed on Nov. 11, 1999.

(51) Int. Cl.
  *G06F 17/60* (2006.01)

(52) U.S. Cl. .............................. 705/31; 705/26; 705/19
(58) Field of Classification Search .................... 705/19, 705/31, 26; 702/27
  See application file for complete search history.

(56) References Cited

U.S. PATENT DOCUMENTS

| | | | |
|---|---|---|---|
| 4,144,567 A | 3/1979 | Tadakuma et al. ........... | 364/405 |
| 4,727,243 A | 2/1988 | Savar ........................... | 235/379 |
| 5,138,549 A | 8/1992 | Bern ............................ | 364/408 |
| 5,193,057 A | 3/1993 | Longfield ..................... | 364/408 |
| 5,220,501 A | 6/1993 | Lawlor et al. ............... | 364/408 |
| 5,335,169 A * | 8/1994 | Chong ......................... | 364/408 |
| 5,396,417 A * | 3/1995 | Burks et al. ................. | 364/401 |
| 5,420,405 A | 5/1995 | Chasek ........................ | 235/379 |
| 5,510,979 A | 4/1996 | Moderi et al. ............... | 364/405 |
| 5,644,724 A * | 7/1997 | Cretzler ....................... | 395/219 |
| 5,774,872 A * | 6/1998 | Golden et al. ................ | 705/19 |
| 5,799,283 A | 8/1998 | Francisco et al. ............. | 705/19 |
| 5,875,433 A | 2/1999 | Francisco et al. ............. | 705/26 |
| 5,987,429 A | 11/1999 | Maritnez et al. ............... | 705/31 |
| H1830 H | 1/2000 | Petrimoulx et al. ........... | 705/31 |
| 6,016,479 A | 1/2000 | Taricani, Jr. .................. | 705/19 |
| 6,058,373 A | 5/2000 | Blinn et al. ................... | 705/26 |
| 6,078,898 A | 6/2000 | Davis et al. ................... | 705/19 |
| 6,078,899 A | 6/2000 | Francisco et al. ............. | 705/19 |
| 6,182,052 B1 * | 1/2001 | Fulton et al. ................. | 705/26 |
| 6,202,052 B1 * | 3/2001 | Miller .......................... | 705/31 |
| 6,360,208 B1 * | 3/2002 | Ohanian et al. .............. | 705/31 |
| 6,463,418 B1 * | 10/2002 | Todd ........................... | 705/26 |

FOREIGN PATENT DOCUMENTS

GB        2215094 A   *   9/1989

OTHER PUBLICATIONS

ICVerify Webpage; http://www.merchantwarehouse.com/products/sw_ICVerify.shtml, 2003.*
WebAuthorize web page; http://www.icverify.com/webauth/features.asp.*
Taxware and Envision Partner to Expedite Direct Marketing Sales; Business Wire; Aug. 1999.*
Taxware Announces "On–Line Tax Calculator on World Wide Web Site at http://www.taxware.com"; Jan. 1997.*
"Taxware Announces Availability of Internet Tax System for Oracle Internet Commerce Server", May 1997.*
"Taxware Announces Availability of Java Versions of Internet Sales Tax Sales/Use Tax, VAT & Address Verification Software System"; Jun. 1997.*
Taxware webpages; May 1999.*

(Continued)

*Primary Examiner*—Steven B. McAllister
(74) *Attorney, Agent, or Firm*—Sheridan Ross P.C.

(57) ABSTRACT

A system and method for computing and collecting taxes is disclosed. In particular, the invention properly computes and collects, e.g., sales and use taxes that is consistent legal guidelines and restrictions imposed by national governments such as the United States. Accordingly, the invention is useful for computing and collecting taxes on Internet sales.

22 Claims, 17 Drawing Sheets

OTHER PUBLICATIONS

"System Overview for Internet Transaction Servers", http://web.archive.org/web–19990222003101/www.taxware.com/current/products/ecomm/index, Feb. 1999.*

Anonymous, "AT&T SecureBuy Service makes Internet sales safe and easy", Newswire, Oct. 1996.*

Anonymous, "Earnigs Up, TS&S, NOVA Prepare For Business Beyond Y2K", Card News, Oct. 1999.*

Anonymous, "Tax News", Accounting Technology, Jun. 1997.*

Berman, Phyllis, "Hat Trick", Forbes, May 1999.*

Anonymous, "Cybersource Drives Globalization of Electronic Commerce with Overseas Points–of–Presence", PR Newswire, Jun. 1998.*

Anonymous, "Heartland Payment Systems and CyberSource Debut One–Stop E–Commerce Payment Solution", PR Newswire, May 1999.*

*TaxNet Systems, Inc.*, 1999, Proposal: "Sales and Use Tax Collection on Interstate Purchases," 7 pgs.

* cited by examiner

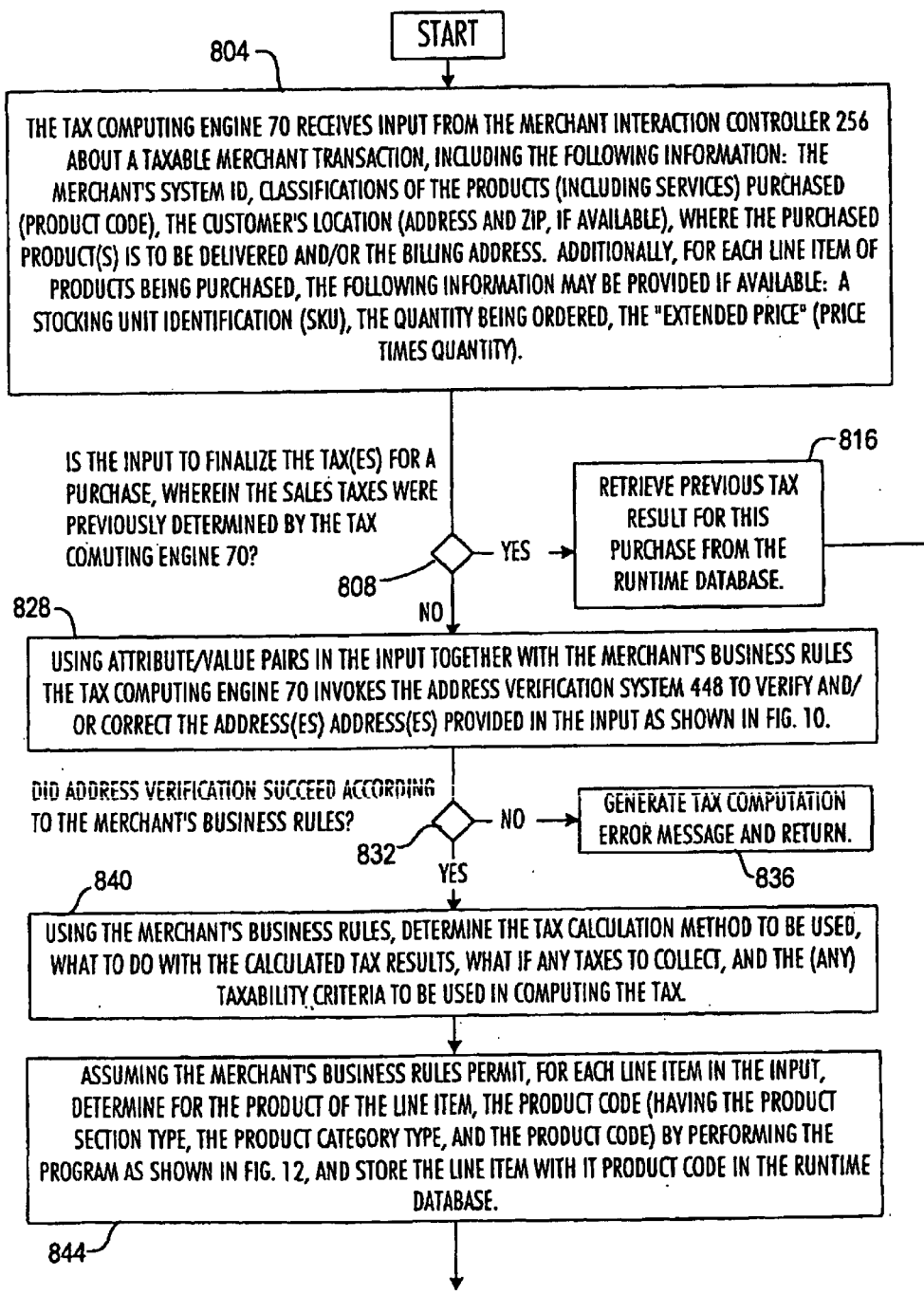

TRANSACTION TAX COLLECTION SYSTEM AND METHOD

The present application claims the benefit of the U.S. Provisional Patent Application having Ser. No. 60/164,976, filed Nov. 11, 1999 which is fully incorporated herein by reference.

RELATED FIELD OF THE INVENTION

A system and method is provided in which sales transactions, including details about the purchaser, and aggregate or detail information about the item(s) being purchased are communicated by vendors, via a network such as the Internet, to a network tax processing site. The system has particular utility in supporting the determination of taxability and the calculation of the appropriate sales and/or use taxes, other sales or per incident related taxation. The system has application for determining taxes for transactions conducted over the Internet. The system performs tax collection, remittance and reporting on behalf of the vendor. The present invention also archives sufficient tax related information for supporting and defending the vendor in tax authority audits. Moreover, tax authorities utilize the present invention to manage taxation determination and calculation mechanisms.

BACKGROUND

Since 1967, when the United States Supreme Court ruled in *National Bellas Hess* v. *Illinois* and reaffirmed in 1992 with the *Quill* v. *North Dakota* decision, the prospect of taxing sales of products purchased from vendors without common nexus with the state of delivery and use (use taxes), has been substantially restricted. In 1977 the Supreme Court used *Complete Auto Transit. Inc* v. *Brady* to establish a four part test to determine if the conduct of an activity could survive a challenge under the Commerce Clause of the United States Constitution. This established a definition to the term "nexus" that had been used in numerous court cases since the 1940's and is the basis for the current concerns that tax authorities have about declining revenues because of increased extra-nexus transactions, especially related to the increased use on the Internet to conduct sales transactions.

Since the above two identified cases were decided, several methods of collecting use tax have been tried, wherein a use tax is a complement to a sales tax in that a use tax is a tax based upon where a good or service (these terms denoted herein by the common term "product") is consumed rather than from whom or where it is purchased. However, none of these methods have met with wide spread acceptance from tax authorities or merchants. Accordingly, some (U.S.) states have begun to put lines on their individual income tax forms requiring voluntary disclosure of purchases subject to use taxes and the subsequent computation and remittance of the taxes due.

In the case of the (U.S.) states and other tax authorities, the impact of court restrictions on use taxes of network (e.g., Internet) purchases has become more severe as purchasing from merchants in diverse geographical locations has become much easier with the growth of commerce on the Internet. However, with advancements in technology, the guidelines that the United States Supreme Court addressed. In particular, increased sophistication and availability of software applications and databases has made meeting the guidelines to accurately calculate, collect and remit/report their sales activities to a large number of tax authorities much easier. Accordingly, it would be desirable to provide a method and system for determining taxes on purchases regardless of whether the purchases are performed substantially via a communications network such as the Internet, or otherwise, and wherein the method and system satisfies the U.S. Supreme Court guidelines.

SUMMARY

The present invention is a network taxation system wherein taxes for both network sales transactions (such as occurs via ecommerce on the Internet), and traditionally non-networked sales transactions (such as occurs with in-store sales) can be determined and optionally substantially automatically collected. The network taxation system of the present invention provides substantial advantages over known prior art systems for collecting taxes in that the present invention is an intermediary between merchants and tax authorities to which the merchants may have tax obligations. Thus, in addition to calculating taxes on sales transactions, the present invention may also collect merchant taxes for subsequent distribution to the appropriate tax authorities, and archive merchant tax records so that transactional tax filings can be performed substantially automatically and electronically through the network taxation system of the present invention. The types of taxes and/or fees that the current invention can be used to calculate and collect include: sales taxes, use taxes, excise taxes, franchise taxes, landing fee taxes, recycling fee taxes, and other transaction related taxes and fees that are incurred on an entire transaction or individual line items of a transaction. In all cases within the present document, wherever the word "tax" or "taxes" is used, any of the above taxes and fees are meant as well as others that are not specifically mentioned herein but which have similar characteristics and dependencies regardless of the tax authority that authorizes their imposition.

The intermediary role of the present invention also offers substantial benefits to the tax authorities that subscribed to or accept the services of the present invention. In particular, just as the network taxation system simplifies and automates the tax calculation and collection for merchants, the network taxation system of the present invention also simplifies and automates the tasks of the tax authorities in collecting taxes, determining compliance with existing tax regulations, and facilitating compliance with new taxes that from time to time are introduced by tax authorities.

It is also an aspect of the present invention that merchants enrolled to utilize the tax services provided by the present invention can customize the tax services provided to them so that the services are compatible with each merchant's business practices. That is, the network taxation system allows each merchant to select or identify a combination of "business rules" that are used in determining how the network taxation system calculates taxes (e.g., different tax rates may be determined depending on whether shipping charges are included in the price of a product or itemized separately), for which tax authorities should taxes be calculated, and what (and when) taxes should be collected (if any).

The present invention incorporates and/or contemplates numerous other advantages and salient features. The complexities of tax calculation for the merchant are substantially eliminated. In one embodiment, the present invention includes one or more network (e.g., Internet) tax gateways (the term "gateway" used herein is intended to be consistent with common notions of what a "gateway" denotes to those skilled in the art of communication networks; e.g., a gateway performs or acts as an intermediary between two groups thereby facilitating and/or automating appropriate communications (or services) between: (a) members of one of the groups, and (b) members of the other group). Moreover, the network taxation system of the present invention may include a plurality of gateways distributed over the network for automatically calculating the appropriate taxes for merchant sales transactions for substantially any tax authority. Thus, the present invention provides a reliable and simple process for determining and collecting taxes wherein one or more network "hubs" or "gateways" are provided as intermediaries between the large plurality of merchants having tax obligations to a potentially large number of distinct tax authorities. Alternatively, certain predetermined tax gateways may be accessed exclusively for taxes collected by certain tax authorities. For example, there may be a designated group of one or more of the tax gateways for each of one or more countries; i.e., a group for the United States and another group for Europe.

Additionally, audits are simplified and facilitated by use of the present invention since the tax gateways can automatically record and electronically report sales transaction tax calculation and collection activity to both merchants and tax authorities. The system of the present invention supports all existing sales, use and other taxes and has the capability of supporting substantially any new transactional tax legislated by a governmental body. Moreover, the net tax obligation on consumers (i.e., merchants and their customers) is unchanged since the system and methodology of the present invention does not require either new taxes or changes to existing taxes. Additionally, the accommodations required by the merchants to utilize the network taxation system do not pose an unreasonable burden on the merchants, and in fact, once a merchant has fully enrolled, the present invention may substantially reduce the merchant's requirement for tax specialists to assure that the merchant's tax obligations are appropriately met.

It is a further aspect of the present invention that the privacy of all purchasers is protected since no report of any purchaser identification information is provided to any tax authority, nor is a purchaser's identification required for a tax calculation and/or collection. Instead, only the purchaser's address is required for identification purposes in connection with tax calculation and collection. The present invention enables tax authorities to collect sales, use and other taxes from, e.g., worldwide web transactions just as they would for traditional sales to customers at the retail outlet itself. All merchants are treated the same with respect to tax calculation and collection since the network taxation system does not distinguish among merchants. Also, the present invention is transparent to the customers of merchants, and there need not be any increased cost passed onto the customer and/or merchant beyond the tax obligations which should be rightfully paid.

It is a further aspect of the present invention that it utilizes the Automated Clearing House (ACH) capabilities of electronic funds transfer provided by U.S. Federal Reserve System. Thus, by registering and utilizing such ACH services provided by the present invention automatically paying taxes, each merchant subscribing to the tax services of the present invention can receive a single sales and use "access" license valid for all tax authorities that have contracted with the present invention for collecting taxes. Accordingly, the present invention may provide merchants with a substantial reduction in the number of tax filings which they might otherwise be required to separately file. In fact, such tax filing reductions may be in the tens of thousands since some taxing authorities require multiple filings per year. Similarly, each participating tax authority can timely receive an accurate remittance of all sales and use tax revenues collected from, e.g., each Internet merchant from one source (the present invention) rather than separately from each of the possible Internet merchants operating in a tax authority's area from around the United States and possibly the world. Furthermore, the present invention substantially simplifies tax audits for both merchants and taxing authorities should an audit become necessary.

The present network taxation system solves many network (e.g., Internet) related tax problems by assessing the appropriate taxes on network sales transactions per existing tax statutes. Tax simplification is obtained by using a single sales and use tax collection system (having a tax "license" either explicitly issued thereto or implied thereto from every tax authority for which taxes are collected). Thus, the present invention can calculate, capture, report and pay sales and use taxes on behalf of merchants. Simplification benefits include: (a) single payment to each taxing authority that is made up of tax collections from numerous merchants doing a wide range and volume of transactions, (b) taxing authorities will be able to electronically review in summary or detail the merchants whose taxes are included in the tax payment, (c) each merchant tax payment is determined by a control system scheduler that triggers the payment per each taxing authority license agreement requirements, (d) a reduction in the number of one-to-one tax relationships between merchants and tax authorities. The present invention facilitates reliance on the existing tax code while supporting implementation of changes to the tax codes.

It is also an aspect of the present invention to utilize table-driven technologies to apply existing tax code definitions for both conventionally taxed goods and services as well as digital goods and services provided electronically over the Internet. Note that a distinction of goods and services between each taxing authority may vary (such goods and services herein also referred to for simplicity by the term "products"). The application of tables will enable each taxing authority to collect the appropriate tax per transaction type. Thus, the present invention is able to apply the tax associated with the transaction based on a point-of-sale, point-of-delivery, point-of-billing, point-of-origin or any other tax collection points that may be defined by a taxing authority.

The present invention supports and maintains all the data associated with each transaction that it records. Thus the combination of existing reports, custom report generation, and historical data enables merchants and taxing authorities to efficiently and effectively address audit requirements. Moreover, by archiving detailed records of taxes calculated and/or collected, the present invention allows both merchants and tax authorities to contractually arrange for tax audits to be performed substantially electronically in most cases.

Other benefits and features of the present invention will become evident from accompanying figures and the Detailed Description hereinbelow.

DETAILED DESCRIPTION

Figure 1:
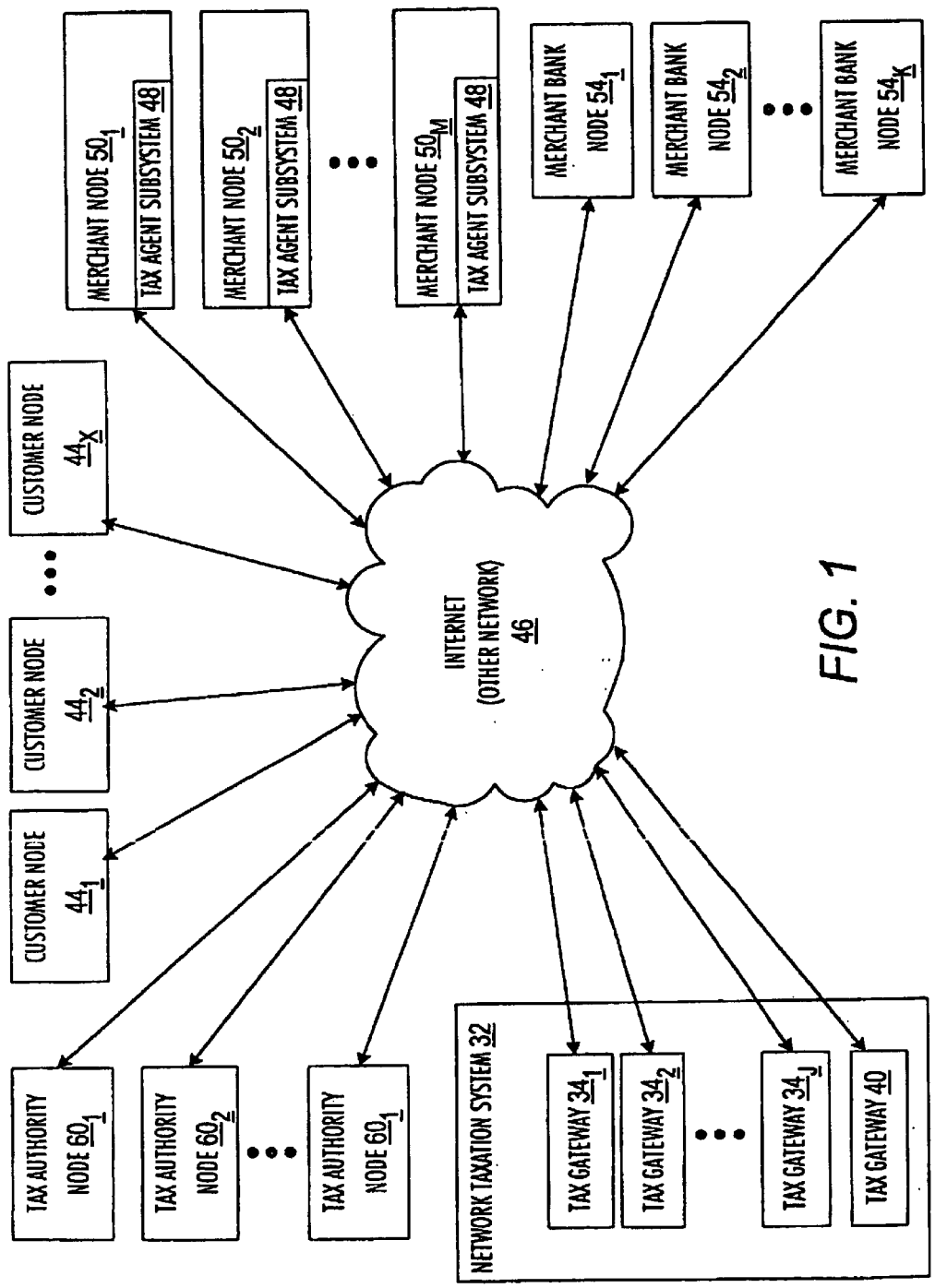
FIG. 1 is a diagram showing the network taxation system 32 to the present invention in the context of its operating environment.
Figure 8:
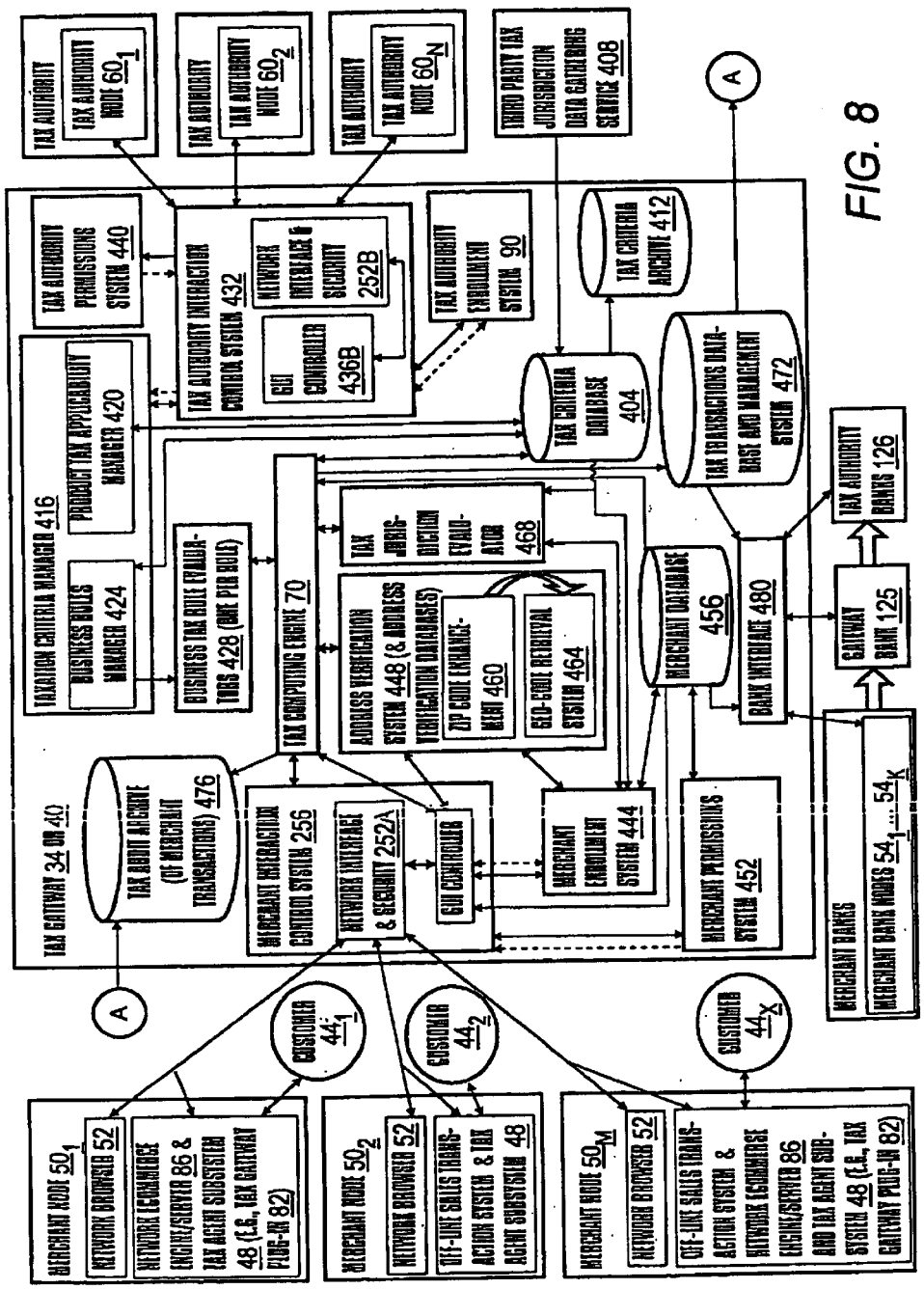
FIG. 8 is a more detailed block diagram of a tax gateway 34 or 40 of the present invention.

With reference to Fig. 1, a network tax collection system (such as for the Internet or other types of communications networks) is illustrated that includes a tax collecting and control system 32 (hereinafter also denoted as merely a "network taxation system"), which preferably includes a plurality of controllers or server machines 34 (e.g. $34_1, \ldots, 34_J$) and a main controller or server 40, wherein controllers or servers 34 and 40 (also denoted tax gateways herein) may be geographically distributed and/or substantially located at a single location. Each of the controllers 34 is essentially comprised of the same components or subsystems and a description of one of them applies to all other controllers $34_1, \ldots, 34_J$. The main controller 40 and each of the controllers 34 typically include a network server interface (for the Internet or other communications networks), a tax processing subsystem and one or more tax related databases. These included components are not shown in FIG. 1. However, they are illustrated in FIG. 8 and described hereinbelow. Each controller 34 may be responsible for determining network sale taxes for commercial transactions occurring on the network 46. The determination as to which commercial transactions a particular controller 34 is assigned for determining and/or collecting taxes can be based on one or more of several factors, e.g., the balancing of workloads between the distributed controllers 34, and/or the network bandwidth between the controllers 34 and the one or more commercial entities (e.g., Internet merchants) for which the present invention provides tax related services (e.g., tax computation, tax collection, etc.).

The network taxation system 32 of the present invention interfaces with a plurality of merchant nodes 50 (e.g., $50_1$ through $50_M$) via the network 46. In particular, each merchant node 50 may have at least two network interfaces to the tax gateways of the network taxation system 32; i.e., (a) a first interface which may include a conventional network (e.g., Internet) browser 52 (shown in FIG. 8) which, e.g., may be used for interactively enrolling the merchant, for allowing the merchant to interactively query its tax records residing with the network taxation system 32, for allowing the merchant to interactively add or modify data input by the merchant that specifies various business practices utilized by the merchant, wherein these business practices have a bearing on the calculation or application of taxes, and for de-enrolling with the network taxation system 32; and (b) a second interface which, in at least some embodiments of the present invention, includes tax related software (i.e., a tax agent subsystem 48, also shown in FIG. 8) that resides on the merchant's node 50 and that the merchant can use: (i) in a first embodiment or version, for accessing one of the tax gateways (34 or 40) in real-time during customer purchases for determining taxes (as is illustrated by merchant nodes 50, and $50_1$ $50_M$ of FIG. 8), and/or (ii) in a second embodiment or version, for periodically downloading from one of the tax gateways tax related data pertinent to the a tax agent subsystem 48 for thereby performing local tax calculation processing not requiring the network taxation system 32 during the calculation of taxes, and for periodically uploading to one of the tax gateways a batch of customer purchase transaction data for a plurality of sales transactions, wherein each of the sales transactions in the batch was previously performed and the tax agent subsystem 48 was at least used to calculate taxes and store these transaction data in preparation for forwarding such sales transaction data to the tax gateway at a later time. An example of the second embodiment or version of the tax agent subsystem 48 is also illustrated in FIG. 8 in merchant nodes $50_2$ and $50_M$ wherein these merchant nodes include an off-line sales transaction system (off-line in the sense of not communicating with the network taxation system 32 via the network 46 during a sales transaction for completing the transaction) such as any one of many sales tracking business systems that are currently available. Accordingly, it is worthwhile to note that this second embodiment or version of the tax agent subsystem 48 need only be capable of appropriately reading batched sales transaction data output by the merchant's non-network sales transaction system so that such sales transaction data can be processed by the present invention.

If the merchant is using the tax related services of the present invention only for his/her network 46 (e.g., Internet) ecommerce sales transactions as in (i) above, then in a first embodiment or version of the tax agent subsystem 48, there may be substantially only a plug-in such as the gateway plug-in 82 shown in merchant node $50_1$ of FIG. 8. Alternatively in a second embodiment or version of the tax agent subsystem 48, the merchant may utilize the tax services of the present invention in substantially an off-line mode (e.g., with network 46 access for completing a "store and forward" process to one of the tax gateways). In this second version of the tax agent subsystem 48, taxes are calculated without initiating a network 46 communication to the present invention during a sale, for at least commonly reoccurring types of taxes such as "point of sale" taxes, and/or taxes for certain predetermined tax authorities or geographical areas, in particular those tax authorities with which the merchant has nexus. However, for the less typical types of sales transactions whose taxes cannot be determined by this second version of the tax agent subsystem 48, such taxes may be determined by some other means. For instance, taxes for such atypical sales transactions are preferably determined by the tax agent subsystem 48 contacting one of the tax gateways either substantially as is done in the first version of tax agent subsystem, or by a user at the merchant's node 50 interactively communicating with the network taxation system 32 via the browser 52 at the merchant node 50. Accordingly, if in this second version of the tax agent subsystem 48, it only contacts one of the tax gateways 34 or 40 for calculating taxes in such atypical sales transactions, then the tax agent subsystem includes at a reduced functionality version of the merchant services provided by the tax gateways. In particular, such a version of the tax agent subsystem 48 will include (in comparison to the tax data and functionality of a tax gateway for the present invention) a reduced collection of tax authority tax rate data (as described hereinbelow as being stored in the tax criteria database 404 of FIG. 8), and additionally a reduced functionality collection of programs for determining tax rates (e.g., only such tax rate programs that are applicable to the merchant's products/services and his/her tax related business practices that have been made known to the present invention). Thus, a merchant can use this second version of the tax agent subsystem 48 in combination with one of the tax gateways to retain his/her tax records for tax filing and tax auditing purposes as well as providing the merchant with a convenient method for paying his/her taxes to the tax authorities whose tax collection criteria has been incorporated into the merchant's version of the tax agent subsystem 48. Moreover, other hybrid versions of the tax agent subsystem 48 may be available to a merchant, wherein such a hybrid version may be:

(a) a third version wherein tax services of the present invention are accessed and used in real-time during ecommerce sales transactions, and non-ecommerce sales transactions are performed according to the second version of the tax agent subsystem 48 (this version is illustrated by merchant node $50_M$ in FIG. 8);

(b) a fourth version wherein no tax calculation is performed at the time of the transaction, but that the data captured by the tax agent subsystem 48 is stored and forwarded as in the second version of the tax agent subsystem 48 with the tax calculation performed by the network taxation system 32 upon receipt.

Since it is common place for customers (at, e.g., customer nodes $44_1$, through $44_X$) to use credit (or debit) cards for making purchases on the Internet, merchant nodes 50 communicate such credit card purchases to one or more merchant banks having one or more merchant bank nodes 54 (e.g. $54_1, \ldots, 54_K$) in order to pay for the item(s) purchased by the customer. The present invention leverages on such well established communications and merchant bank fund transfers to provide particularly beneficial and novel method and system for transferring collected taxes between the merchants and various taxing authorities. In particular, the present invention uses (in the U.S.) the Automated Clearing House (ACH) provided by the Federal Reserve System for electronically moving money between banks. Accordingly, the present invention may be considered as a tax "gateway" not only for the computing of taxes, but also for the collecting and disbursement of taxes.

The method and system of the present invention also includes a network 46 interface (not shown in FIG. 1, but shown as a tax authority interaction control system 432 in FIG. 8) with a number of number of tax authority designated computer or network nodes 60 (e.g., $60_1, \ldots, 60_N$). Each of the tax authority designated nodes 60 may include one or more network servers and/or one or more individual or personal computers for communication over the network 46. Each tax authority designated node 60 is associated with at least one authorized tax authority for collecting taxes related to purchases of goods and/or services, e.g. on the Internet 46.

The main controller or server 40 communicates with each of the distributed controllers 34. Such communication can be accomplished using the Internet 46 or some other satisfactory communications network(s). The main controller 40 is responsible for overseeing the operations of the distributed controllers 34 including the supplying of information, such as updates, enhancements and other useful information related to the functionalities, involvements and other communications of the distributed controllers 34. Additionally, the main controller 40 may, in some embodiments, also direct network 46 communications with other network nodes such as the merchant bank network nodes 54 and the tax authority network nodes 60 (as described further hereinbelow). The main controller 40 also may receive purchase or sales transaction information provided to it by the distributed controllers 34 in order to store, generate reports or otherwise process such information (including tax collection related data) for sending to the proper or authorized entities in network communication with the present invention. The main controller 40 may be responsible for initiating transfers of tax monies from the merchant banks (having network 46 access via merchant bank network nodes 54), wherein each merchant bank has been identified by a merchant (enrolled to obtain tax processing services from the present invention) as the holder of an account(s) of the merchant from which taxes may be collected. In particular, the main controller 40 (alternatively, each of the controllers 34 individually) may periodically request funds from the merchant bank of each merchant affiliated with the present invention for collecting taxes owed, and, such collected tax funds are either deposited in an escrow account from which funds are subsequently disbursed to the tax authorities (e.g., tax authorities having network 46 access via tax authority network nodes 60), or the collected tax funds may be substantially immediately disbursed to the tax authorities.

Figure 2:
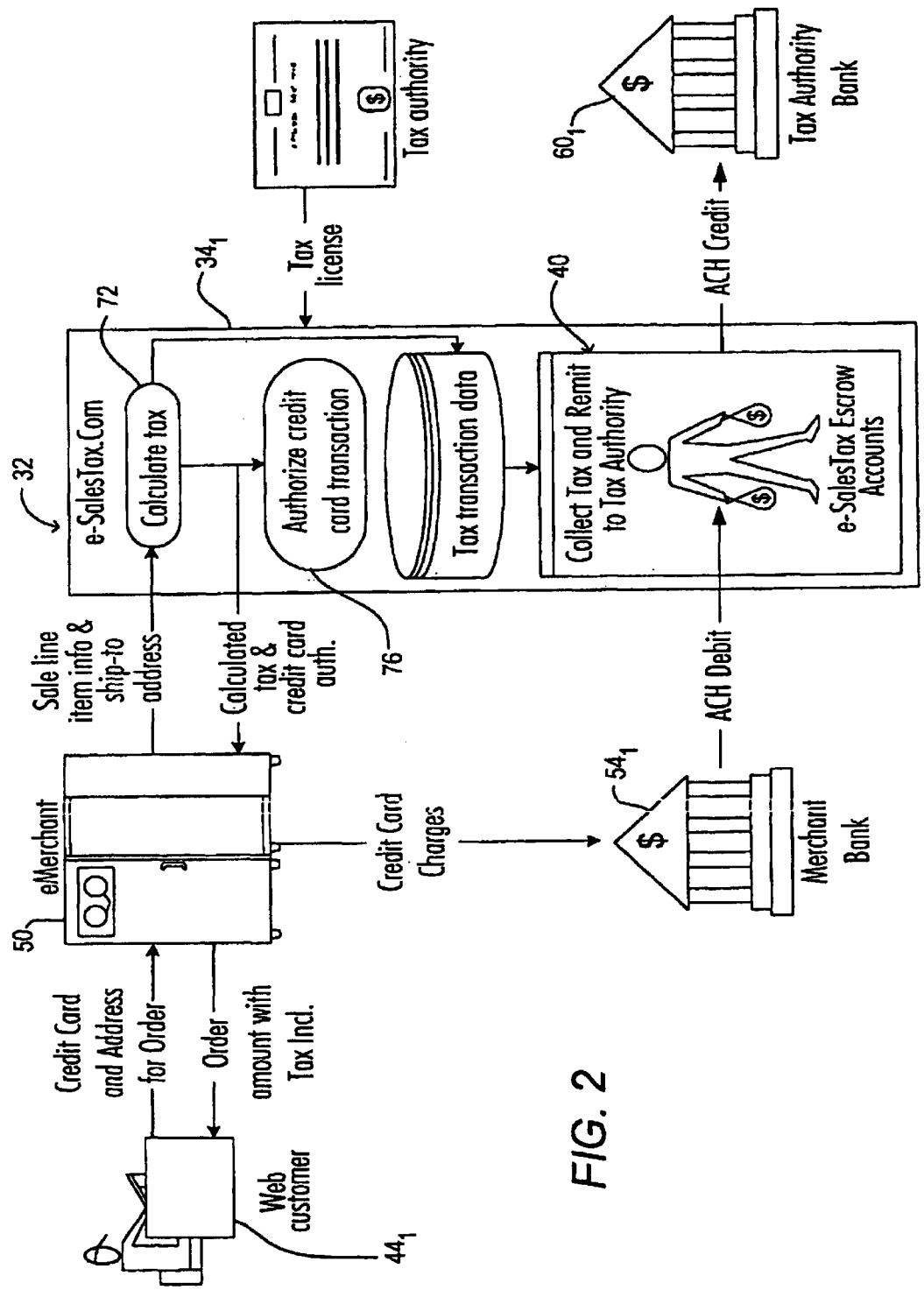
FIG. 2 is another illustration of the present invention showing some of the components within a tax gateway (34 or 40) for the present invention.

With reference to FIG. 2, further detail is provided of the control system 32 and its network communications with a merchant (via merchant node $50_1$), the merchant's bank (via merchant bank node $54_1$) and the tax authority node $60_1$, (which, in at least some embodiments, may be the financial institution for the taxing authority). In particular, FIG. 2 illustrates that the present invention, in addition to computing taxes on network 46 sales, also acts as a clearinghouse for the collection of taxes (e.g. sales taxes, use taxes, excise taxes, etc.) and for providing of reports to the appropriate tax authority and/or merchant.

Still referring to FIG. 2, at least some of the high level functionality of the present invention may be described. Thus, in one embodiment, a customer using the customer computer $44_1$ and, e.g., a web browser (not shown) accesses the merchant node $50_1$ via the network 46 in order to purchase one or more products and/or services from the merchant associated with the merchant node $50_1$. As part of the purchase or financial transaction, the customer computer $44_1$ inputs credit card and address information to the merchant node $50_1$. The merchant node $50_1$ transmits to the network taxation system 32 (or more precisely, one of the tax gateways 34 or 40, for simplicity denoted $34_1$, in FIG. 2) information describing the sale (e.g., a sale total, and/or a detailed line item description of the products/services purchased in sale) and address information (e.g., a ship to address, a bill to address, and/or an initiation address/location for the sale). In one embodiment, a tax computing engine 70 (shown in FIG. 8) calculates the sales or other taxes associated with the customer's purchase as indicated by the "Calculate Tax" process representation 72 in FIG. 2. Additionally, as indicated by the "Authorize Credit Card Transaction" process representation 76 in FIG. 2, the network taxation system 32 (i.e., one of the tax gateways 34 or 40) may also communicate to a credit card authorizing agent (e.g., VISA, MASTERCARD, etc) for providing the credit card identification which the customer has supplied to pay for the goods and/or services ordered, e.g., via the network 46. The calculated tax and (any) credit card authorization information are sent by the controller $34_1$, to the merchant node $50_1$. In one embodiment, the merchant node $50_1$ can include a tax determining software agent (i.e., a version of tax agent subsystem 48 such as the network server tax gateway plug-in 82 as shown in FIG. 8) that is integrated with the merchant's sales tracking system (e.g., the merchant's ecommerce engine/server 86 shown in FIG. 8) for communicating with the controller $34_1$. The tax agent subsystem 48 can be installed on the merchant node $50_1$ by, e.g., downloading the tax agent subsystem via the network 46. Moreover, the merchant's bank or another entity responsible for managing credit card transactions may authorize the use of the customer's credit card. Accordingly, data for the credit card charge for the customer's purchase may also be communicated to the merchant bank node $54_1$, which has the merchant account associated with the merchant for merchant node $50_1$.

With regard to the tax collection process, the main tax gateway 40 (or alternatively each tax gateway 32) has the authority to debit a merchant bank account (for merchants subscribing to such tax collection services offered by the present invention) by means of the automatic clearinghouse (ACH) debit procedure provided by the U.S. Federal Reserve System for electronically moving money between banks whereby the main tax gateway 40 secures the collection by wire (or wirelessly) for the aggregated tax amount(s) of the purchase transaction(s) made by the customer(s) through the customer's computer(s) $44_1$ completed during an agreed upon timeframe e.g. daily for all activity from the prior calendar day Accordingly, in one embodiment of the invention, there is an agreed upon time (previously determined with one or more tax authorities), wherein the main tax gateway 40 is involved with a communication to the tax authority designated nodes (e.g., tax authority node $60_1$) wherein a credit in the amount of the collected tax is communicated to the tax authority designated. Each tax authority designated node 60 may be part of, or associated with, a particular bank authorized by the tax authority to receive the ACH credit (i.e., for taxes collected). As will be described in greater detail hereinbelow, a tax authority may contract with the present invention for the collection and disbursement of taxes. In such contractual arrangements, a tax license will be provided authorizing the present invention to collect and disburse collected taxes. However, the present invention may also collect taxes for tax authorities without a tax license. Additionally, note that prior to remitting tax funds to the proper tax authority, the collected tax monies are typically commingled in one or more escrow (impound, non-interest or interest bearing) accounts accessible for fund transfers by the main tax gateway 40. On a periodic basis, as determined by each tax authority, taxes collected from the merchants are aggregated and transferred from the impound account to the authorized account associated with the tax authority designated computer, via a standard ACH credit.

In one embodiment of the present invention, for each transaction handled by the tax gateway $34_1$, the main tax gateway 40 can generate transaction related reports and provide them to the appropriate entity, such as the tax authority associated with the tax authority node $60_1$. Such reports can be used to document the transactions that occur, including the obtaining and paying of the collected sales. Information on which the reports are based is obtained by the main tax gateway 40 from the distributed tax gateways 34, such as the tax gateway $34_1$.

Additionally, in one embodiment, procedures or other safeguards can be conducted, if desired, related to verification of proper tax collections and payments. For example, reports and other communications may be provided between the enrolled merchants and tax authorities, as well as the merchant banks, by means of their respective computers, network nodes or other communication channels. Consequently, checks can be incorporated into the tax collecting and control system 32 for confirming that the appropriate tax information is provided to the tax authorities by the main tax gateway 40.

Figure 3:
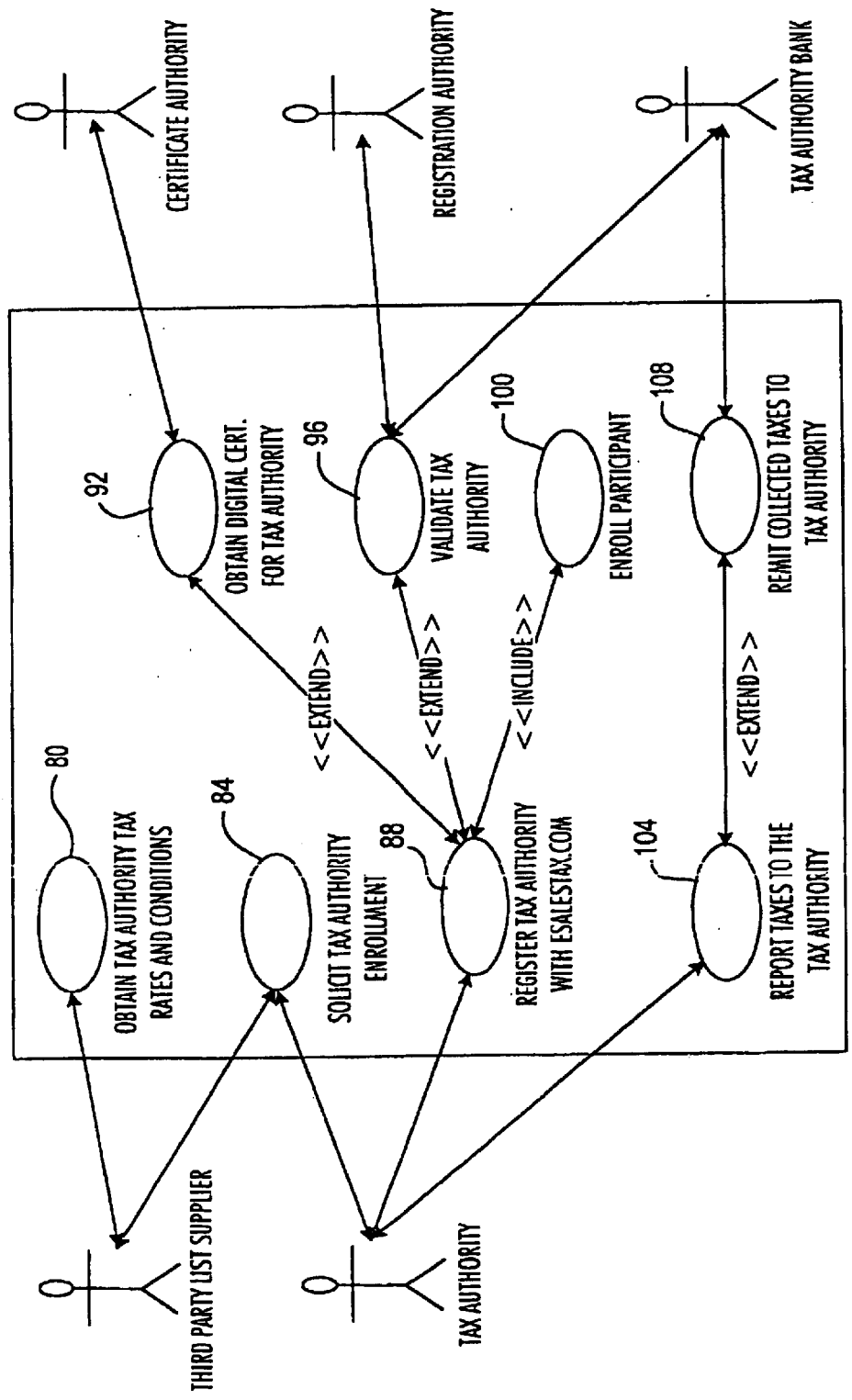
FIG. 3 shows some of the high level processing performed by the present invention when interacting with a tax authority for, e.g., enrolling/registering, reporting to, and collecting taxes for the tax authority.
Figure 4:
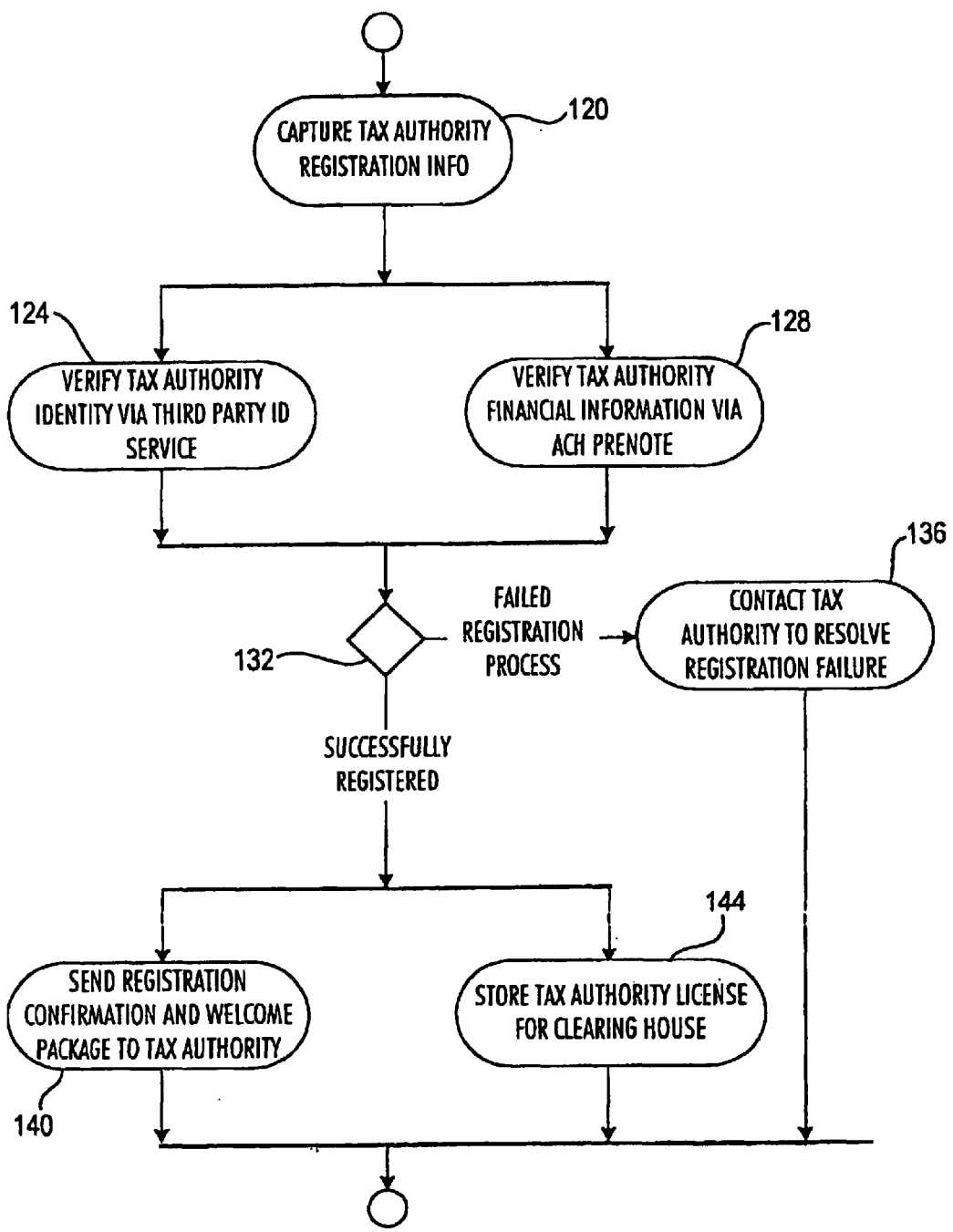
FIG. 4 is a high level flowchart describing the steps performed in registering a tax authority with the network taxation system of the present invention.

With respect to enrolling the several entities, particularly the merchants and the tax authorities, reference is made to FIGS. 3 and 4. FIG. 3 illustrates operations and functions of the main tax gateway 40 (and/or the tax gateways 34) in connection with its involvement with the tax authority entities. FIG. 4 relates to registering a particular tax authority so that it can avail itself of the services of the present invention, and can properly communicate with one or more of the distributed tax gateways 34 and/or the main tax gateway 40.

In enrolling tax authorities, a list thereof can be obtained from a third party list supplier to obtain tax authority tax rates and conditions. Each tax authority on the list can be solicited for possible enrollment with the network taxation system 32. Regarding tax authorities that become part of the network taxation system 32, certain steps are conducted by the tax authority enrollment system 90 of FIG. 8. In particular, the process or operation 88 (FIG. 3) is performed by the tax authority enrollment system 90. In particular, the registration process 88 involves a number of related substeps or operations. Optionally but related to operation 88 is the operation 92 for obtaining a digital certification from the registering tax authority. Note that the main tax gateway 40 is involved with obtaining such digital certifications for tax authorities. Such a digital certification functions as a unique identifier or marker, much like a signature, and acts to certify the activity or operation, such as a communication, as being from or associated with the particular and expected tax authority or its designated representative. Such a digital certification is intended to safeguard against acting on communications that do not emanate from or are not authorized by the tax authority of interest. For example, if such a digital certification accompanies a communication from the tax authority, greater certainty is assured that the communication is an authorized communication. The registration process 88 may include an operation 96 to validate the tax authority, wherein certain steps are performed for ensuring that the tax authority to be enrolled is proper or legitimate. Such steps may be performed by a third party service, which may communicate with, e.g., the main tax gateway 40. In any event, once desired steps are performed concerning the validity of the tax authority, the particular tax authority may become an enrolled participant for using the tax related services of the present invention via the enroll participant operation 100 (FIG. 3). Once enrolled (such as via the network 46 and the tax authority designated network node 60₁), the particular tax authority may be provided with reports or other documentation transmitted via network 46 by the main tax gateway 40. These reports can be related to determining taxes that are due arising from transactions submitted to the present invention by enrolled merchants for tax calculation, as identified in operation 104 of FIG. 3. Similarly, the main tax gateway 40 cooperates with the tax authority designated network node 60 in remitting collected taxes for such transactions, such as sales taxes, use taxes or other appropriate transactional taxes, in accordance with operation 108. Note that a database or other memory subsystem of the main tax gateway 40 (or tax gateways 32) can support the reporting of tax collection activities in substantial detail if such is requested by the tax authority.

With reference to FIG. 4, additional information is described in the context of the registration process 88 of FIG. 3. In particular, in accordance with step 120, the main tax gateway 40 (or tax gateways 32) is used in capturing tax authority registration information. Such registration information can be part of a registration form that is provided to the particular tax authority via the network 46. From this registration form, the following is collected by the main tax gateway 40: tax authority name, a tax authority personal identification (PID), a tax authority bank account RTN (routing and transit number)/account number, tax authority contact(s), and tax authority filing requirements for tax remittance, etc. After such tax authority information is obtained, the step 124 of verifying the tax authority identity is performed. Such verification is typically done by a third party service involved with, or specializing in, identity verifications. Typically, in parallel with the verification step 124, the step 128 is performed wherein the main tax gateway 40 is also involved with verifying the tax authority financial information by means of an ACH prenote. The ACH prenote essentially ensures that proper and expected communications are accomplished, such as a desired debiting of funds from a bank account for the present invention (denoted in FIG. 8 as gateway bank 125) and electronically transferring such funds to the tax authority's designated node 60 (e.g., at a bank 126 for the tax authority, such as is also shown in FIG. 8) will succeed.

At step 132, a determination is made as to whether the registration process for the tax authority has been successful or has failed. If the registration process failed, steps are conducted in accordance with the process at 136 to attempt to resolve the registration failure. Note that step 136 may be triggered by and subsequently involve the main tax gateway 40. On the other hand, if there is successful registration, at step 140, the main tax gateway 40 may be responsible for or involved with sending information such as registration confirmation and a welcome package to the newly registered tax authority. In particular, such information may include worldwide web usage instructions for accessing the tax gateways 40 or 34, ACH clearinghouse information, sales and use tax license identification, as well as any other information necessary for achieving the desired communications related to tax collection. Also, on completing a successful registration of the tax authority (e.g., associated with the tax authority designated computer 60₁), in step 144, the main tax gateway 40 stores information related to the license for tax collection that is granted to the network taxation system 32 by each tax authority, if appropriate.

In addition to the verification steps 124, and 128, either with the involvement of the main tax gateway 40 or under some other appropriate control and communications link, a written agreement is provided to the tax authority that grants the gateway control system 32, and particularly the main tax gateway 40, the necessary rights to perform the tax collection services as an agent of the newly registered tax authority. This agreement, executed by an authorized representative of the tax authority, is returned and manually validated by one or more individuals associated with the tax authority enrollment program of the present invention.

Figure 5:
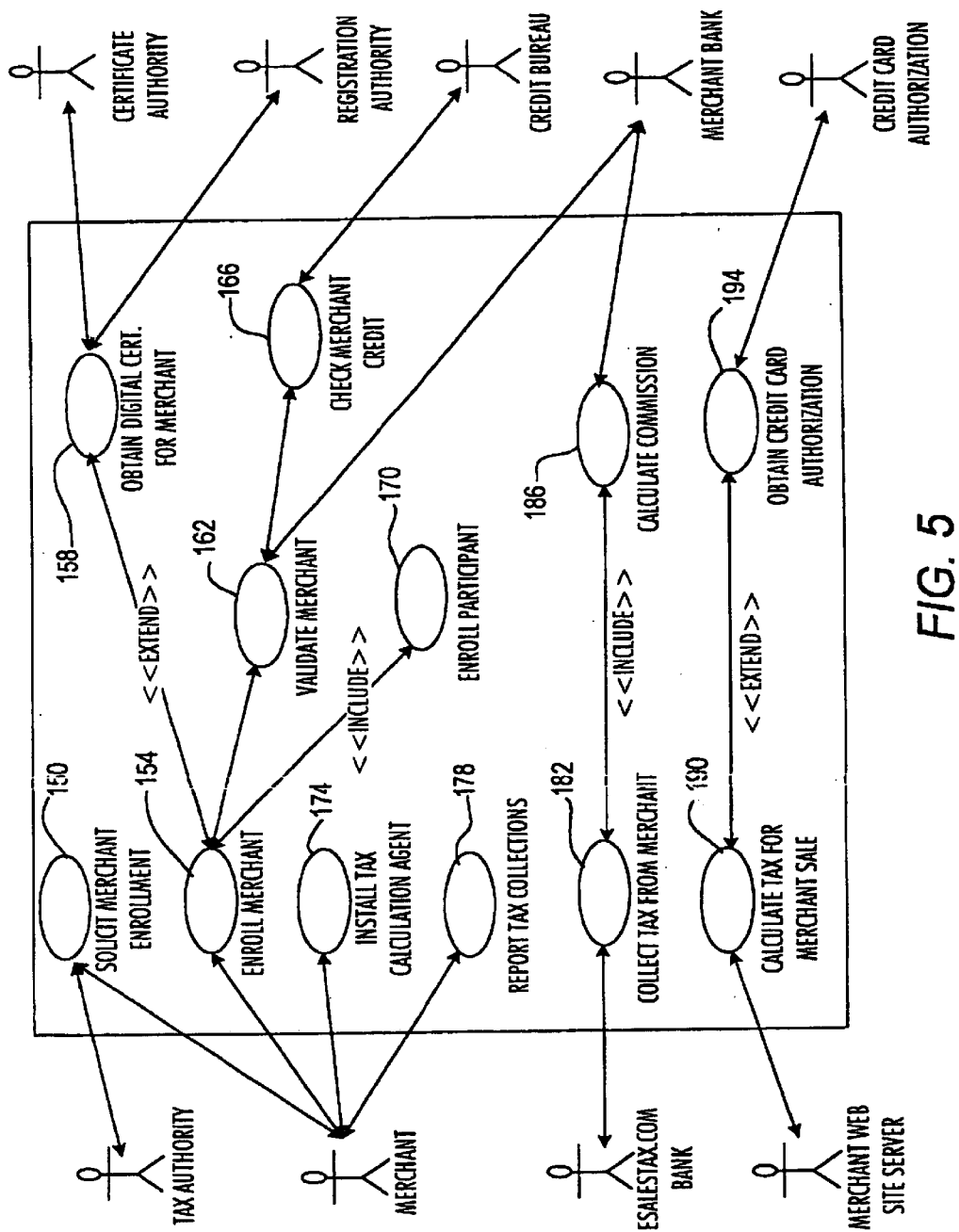
FIG. 5 shows some of the high level processing performed by the present invention when interacting with a merchant for, e.g., enrolling/registering, receiving taxable transactions, and collecting taxes for the merchant.

With reference to FIG. 5, a discussion is next provided in connection with enrolling/registering merchants associated with the merchant nodes 50₁, . . . , 50_M. At step or process 150, merchants can be solicited for participation in the network taxation system 32. In process 154, the merchant is enrolled or registered with the present invention, wherein the network taxation system 32 has obtained: (a) sufficient information to uniquely identify sales transactions received from the merchant for performing tax calculations, (b) information indicating where the merchant has nexus (i.e., where the merchant has a physical presence for determining the tax authorities to which the merchant must collect taxes, e.g., for in-store sales), and (c) "business rule" merchant input indicating both what services the merchant desires the network taxation system 32 to perform as well as indicating certain aspects of how the merchant performs his/her business, wherein these aspects (more specifically, the corresponding merchant input thereto) may be used in determining which tax rates (if any) are applicable to various transactions. As part of the enrollment of the merchants using, in the process 154, just as with the tax authorities, a digital certification may be obtained for the merchant in process 158. Accordingly, for each merchant enrolled to use the tax related services of the present invention, authorization for registration and authorization for the particular digital certification are obtained. Moreover, a validation process 162 is also conducted as part of the enrollment process. Such validation can include the subprocess of checking merchant credit in process 166 by utilizing, for example, the services of one or more credit bureaus. Such a validation can also include contacting and obtaining validation and other authorization from one or more merchant banks associated with the merchant. Once these checks are successfully completed, the merchant is registered or enrolled as a participant in the network taxation system 32 in process 170, wherein, e.g., the network taxation system stores the merchant information (a)–(c) described above regarding process 154.

Continuing with FIG. 5, once a merchant is registered, in process 174 the merchant is able to download (otherwise obtain) from, e.g., one of the tax gateways 34 and/or 40, the tax agent subsystem 48 (e.g., a version thereof denoted a gateway plug-in 82 in FIG. 8). More specifically, the merchant is provided with a version of the tax agent subsystem 48 as described hereinabove. The tax agent subsystem 48 includes a software package or module related to enabling communications between one of the tax gateways 34 or 40 and the merchant's node (for simplicity here, identified with merchant node $50_1$), particularly in the context of tax calculations based on sales or other financial transactions conducted by the merchant with its customers. The tax agent subsystem 48 can be installed on the merchant node $50_1$ by, for example, downloading the tax agent subsystem to the merchant node $50_1$ from one of the tax gateways 34 or 40. Alternatively, the tax agent subsystem 48 may be distributed on a portable storage media such as an optical disk and sent to the merchant for installation on the merchant node $50_1$. Once the merchant is enrolled with the present invention and has the tax agent subsystem installed, the merchant node $50_1$ can provide information related to tax calculations and collections based on sales transactions by the merchant with its customers. Corresponding to such sales activities, the main tax gateway 40 may provide information, including reports, to the merchant node $50_1$ related to such tax information. In process 182 of FIG. 5, one of the tax gateways 34 and 40 collects tax from the merchant, such as by debiting the merchant's bank (via, e.g., an electronic ACH transfer through the merchant bank node $54_1$) associated with the merchant having the merchant node $50_1$. In one embodiment, at the time that such tax is collected, the present invention may also calculate a commission or other fee, in process 186, for performing tax calculations, address verifications and/or collecting services. Such a fee constitutes a payment for the clearinghouse services it provides.

With respect to collecting the tax from the merchant, a particular tax gateway 34 such as the tax gateway $34_1$ may calculate the transactional tax for each sales transaction transmitted to the tax gateway $34_1$ by the merchant node $50_1$ in process 190 (FIG. 5). In this embodiment, the tax gateway $34_1$ determines the amount of the tax, rather than the merchant node $50_1$. In an alternative embodiment, the transactional tax may be calculated by the merchant at a merchant site and the resulting tax records transmitted periodically by the merchant node $50_1$ to, e.g., the tax gateway $34_1$ using an approved data transfer program previously provided to merchant. Note that the tax gateway $34_1$ may also include a process 194 for credit card authorization from the credit card entity supporting or sponsoring the credit card used by the customer in making the purchase of the good(s) and/or service(s) from the merchant.

Figure 6:
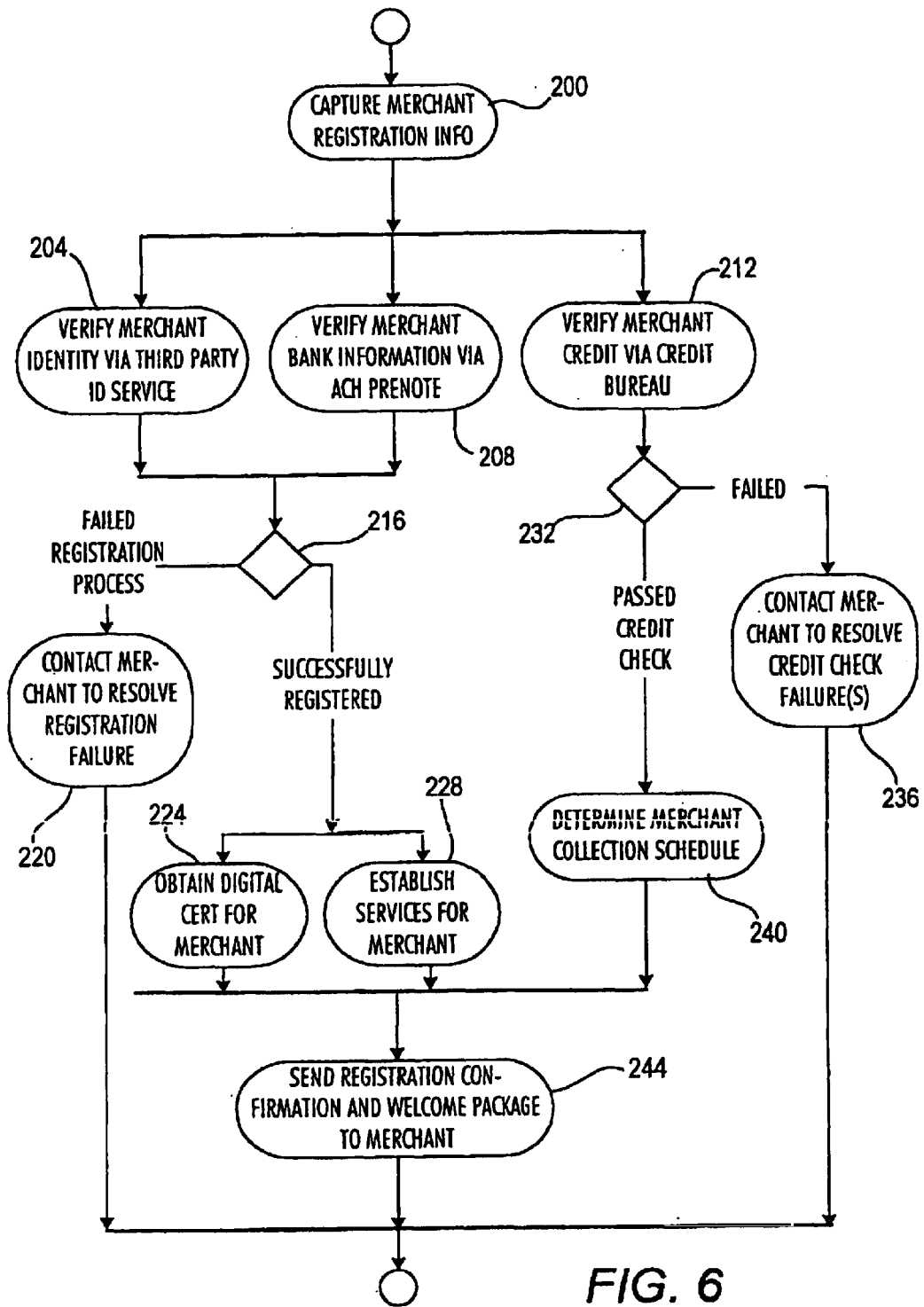
FIG. 6 is a high level flowchart describing the steps performed in registering a merchant with the network taxation system of the present invention.

With reference to FIG. 6, more information is provided in connection with an embodiment for enrolling a merchant as a participant in the network taxation system 32 of the present invention. In accordance with the step 200, the main tax gateway 40 may be involved with capturing appropriate merchant registration information by network 46 communications, for example, involving the merchant node $50_1$. The registration information obtained from the merchant by the main tax gateway 40 may include the following: merchant name, merchant federal tax ID number, merchant bank RTN (routing and transit number)/account number, merchant location(s), merchant credit/payment profile including name, account and location of one or more credit references, the merchant's contact person (when it is necessary for the network taxation system 32 to contact the merchant), and the location (phone number, mailing address and/or email address) of the merchant's contact person. Once this merchant enrollment information is obtained by the network taxation system 32, certain verification processes can be conducted, either in parallel or serially, which can use the capabilities of the main tax gateway 40 in order to register/enroll the merchant associated with the merchant node $50_1$. In particular, at step 204, the main tax gateway 40 can be involved with verifying the merchant identity via a third party identification service to make sure that the merchant is the entity who it purports to be. At step 208, the merchant bank associated with this particular merchant is also the subject of a check made by the main tax gateway 40, wherein this check verifies that proper debiting of the account of the merchant at the merchant bank can be accomplished through communications between the main tax gateway 40 and the merchant bank node $54_1$ using an ACH prenote. The main tax gateway 40 can also be involved with a further verification step 212 related to verifying merchant credit via one or more credit bureaus.

After the steps 204 and 208 related to merchant identity verification and merchant bank information or operation have been performed, a determination is made (step 216), utilizing the main tax gateway 40, as to whether or not such verification processes constitute a successful or failed registration process. If it is determined that it failed, the merchant associated with the merchant node $50_1$ can be contacted to seek to resolve the grounds for the registration failure at step 220. Conversely, if the registration steps associated with such verifications are successful, the main tax gateway 40 may obtain a digital certification for the merchant at step 224, via a request and other communications between the main tax gateway 40 and the merchant node $50_1$. A successful registration/enrollment also requires that the main tax gateway 40 conduct the necessary setup associated with the communications and providing of tax collection services for the particular merchant, in accordance with the step 228. Related to, or part of, establishing the services at step 228 can be the installation of (a version of) the tax agent subsystem 48 onto the merchant node $50_1$, such as on its webserver, or alternatively, the merchant's personnel can use the web pages available on, e.g., the main tax gateway 40 to enter and manage transactions, including entry of new sales transactions, managing transactions for returned merchandise and losses sustained in the course of doing business with purchasers (fraud, failure to pay, damaged goods, etc.). Note that in one embodiment of the network taxation system 32, transactional taxes that have been collected may not be refunded to the merchant in cases where the merchant was not appropriately compensated for the sale. Instead, the merchant may receive a tax credit(s) from one or more of the tax authorities, wherein such a credit(s) can be applied against additional taxes owed. Alternatively, in another embodiment of the present invention, the network taxation system 32 may provide refunds to the merchants. Thus, the network taxation system 32 may subsequently receive the merchant's refund and/or credit on behalf of the merchant.

With respect to the step 212 related to verifying merchant credit, a determination is made at step 232 as to whether or not this verification was successful. If this verification fails, then the merchant associated with the merchant node $50_1$ is contacted in order to resolve the grounds for any such credit check failure at step 236. Conversely, if the credit check is deemed successful using the main tax gateway 40, a step 240 for determining the collection schedule for the merchant is accomplished, with such collection scheduling being related to debiting the merchant's account at the merchant bank identified by the merchant during enrollment.

Once these merchant enrollment processes or steps are completed, the main tax gateway 40 can also be involved at step 244 in sending registration confirmation and system package materials to the merchant, which can include pertinent security information. As part of the completion of the registration process, the main tax gateway 40 activates the merchant's merchant node $50_1$ for the tax determination procedures and data transmission between the merchant node $50_1$ and the tax gateway 34.

Figure 7:
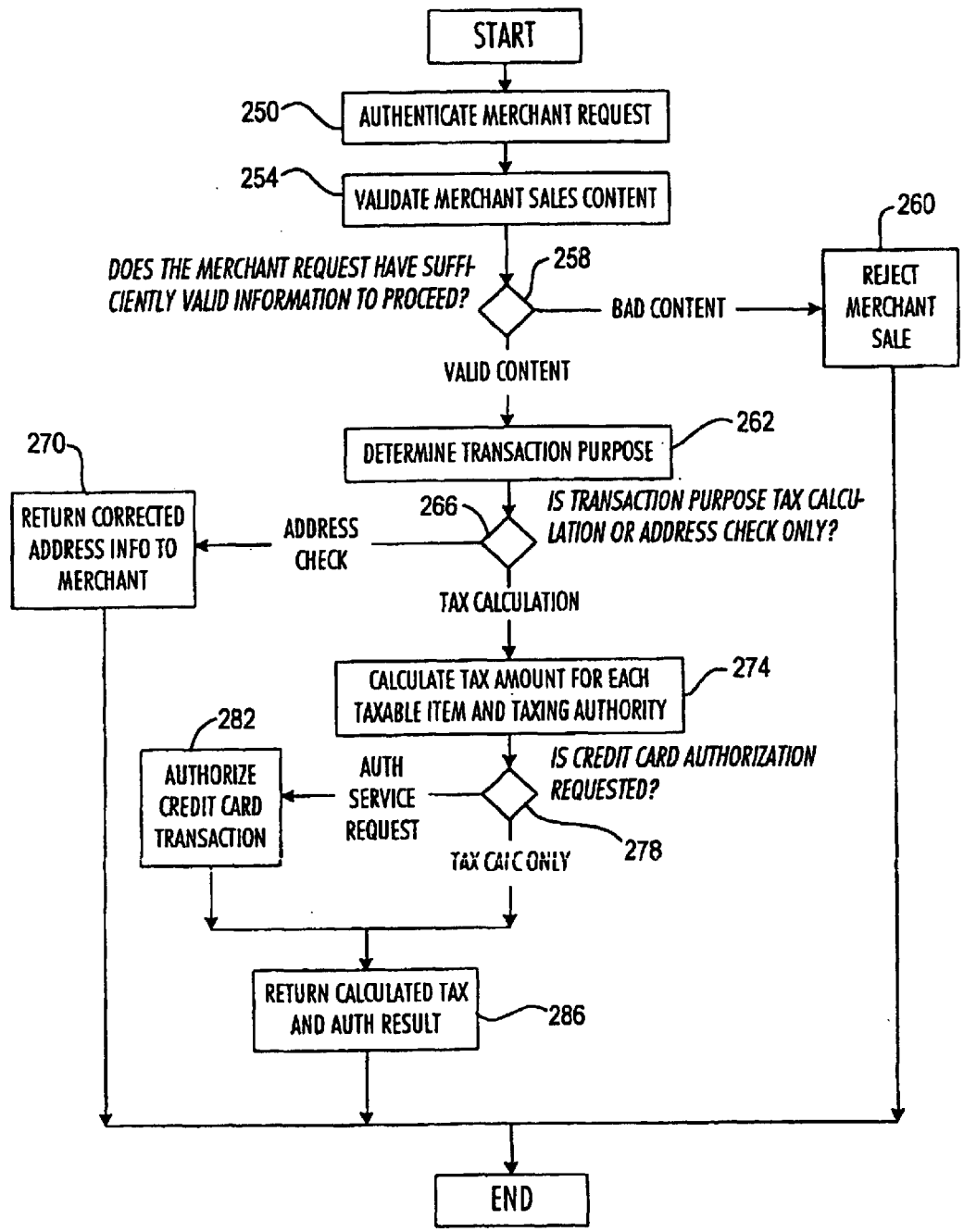
FIG. 7 is a high level flowchart showing the steps performed when the network taxation system 32 processes a merchant request having sale transaction data therein for determining the (any) taxes due on the sale transaction data.

With reference to FIG. 7, more detailed information is next provided in connection with the tax calculation process performed by the network taxation system 32 when there is a transaction between a merchant and one of its customers wherein the transaction precipitates a tax calculation. In one embodiment, a tax gateway 34, such as the tax gateway $34_1$, is responsible for the calculation of the required tax, such as the tax(es) associated with a transaction between the merchant and its customer. At step 250, by virtue of such a transaction, a request for tax calculation on the transaction is received from the merchant node $50_1$ by the tax gateway $34_1$, and the tax gateway $34_1$ authenticates this request. Note that the contents of the request may be provided to a secure socket layer (SSL) of the tax gateway $34_1$ (this layer is included in the network interface security 252A of FIG. 8). Further note that merchant's request may be encrypted using private encryption key available to the merchant as one skilled in the art will understand. The request can include an identification of the item(s) (good(s) and/or service(s)) being purchased, for each line item, an item tax category (e.g., a "product code"), the extended price, the quantity purchased and for the transaction, the merchant's digital certification for verifying the merchant, the destination of the purchase (and/or each item thereof) such as the street address and zip code, and the order status (e.g. being invoiced). At step 254, the content of such information is validated by the tax gateway 34 (and more particularly, by the merchant interaction control system 256 shown in FIG. 8). If it is determined at step 258 that there is insufficiency and/or inaccuracy in such information, the tax gateway $34_1$ communicates a rejection to the merchant node $50_1$. On the other hand, if it is determined at step 258 that the information content received from the merchant computer $50_1$ is valid, then the distributed tax gateway $34_1$ makes a determination regarding the purpose of the transaction at step 262, such as what taxes are to be calculated related to this merchant request. In particular, note that it is an aspect of the present invention that the merchant may identify the tax authorities for which he/she wishes to have taxes calculated and/or collected. Thus, in one embodiment, the merchant may provide input to the tax gateway $34_1$ (via "business rules" indicating the business practices the merchant uses in conducting his/her business) to have state taxes calculated and collected, county taxes only calculated, and any other local taxes (e.g., city) taxes not calculated. At step 266, a determination is made as to whether the merchant's transaction is requesting address verification only, or tax calculation (which requires address verification to be performed). Note it may be necessary (or requested by the merchant) that the tax gateway $34_1$ provide a corrected address, if the customer's address is determined to be incorrect. This is accomplished at step 270, wherein the tax gateway $34_1$ communicates the corrected address to the merchant node $50_1$. Note that a more detailed description of the processing performed in step 270 is provided in FIG. 10 described in detail hereinbelow).

Continuing with the procedure of FIG. 7 after the address check of step 266, in accordance with the step 274, the following sequence of substeps is performed:

Substep (a) A determination is made of the tax authorities that have jurisdictional authority (i.e., nexus) for the confirmed address designated for the transaction.

Substep (b) Using the business rules in effect for the merchant at the time of the transaction, an assessment is made as to which, if any, of the tax authorities having nexus will be considered for taxation. The merchant may choose, via business rules, not to collect taxes from its customers for tax authorities with which the merchant does not share nexus (see United States Supreme Court case *Complete Auto Transit, Inc* v. *Brady* for the four part test developed to survive a Commerce Clause challenge).

Substep (c) Upon determining which, if any, tax authorities will have authority to impose taxation, a determination is made of what taxes are in effect on the date of the transaction. Note that some tax authorities impose different taxes and/or different tax rates for different groups of products. For example, in the United States, the state of New York has separate taxes for clothing from other general merchandise products.

In this instance, in New York, for clothing the following are different from the sales/use taxes of other general merchandise: the tax rate, the minimum tax imposed, the maximum tax imposed, the price breaks for determining different tax rates to impose.

Substep (d) If the merchant's business rules indicate that the merchant does not itemize the sale of products within transactions, that is, each transaction is received from the merchant containing only a total amount of the sale, then the transaction is evaluated for a product identification (i.e., for determining a single product code for the transaction) to use in determining which, if any, of the taxes imposed (see substep (c) above) by the tax authorities holding jurisdiction (see substep (a) above) that have been accepted as applicable to this merchant (see substep (b) above) apply to the sale. Note that such a product code may be determined by (i) a valid product code value sent with the transaction by the merchant, (ii) a default product code selected by the merchant, e.g., as part of their enrollment with the network taxation system 32.

Substep (e) If the merchant's business rules indicate that the merchant itemizes the sale of products within transactions, that is, each transaction includes detail information for each "line item" (such as occurs on an invoice containing detail for each product ordered or on a cash register receipt containing detail for each product included in a purchase), then for each product corresponding to such a line item, product identification (e.g., the product code) is determined from data included with the line item. In particular, such data may be: (i) a valid product code, (b) a recognized merchant stocking unit (SKU) known to the network taxation system 32 (i.e., a recognized SKU is one that the merchant has previously recorded at, e.g., the main tax gateway 40 and correlated to a product code designated by the network taxation system 32), or (iii) using the merchant selected default product code selected as part of, e.g., the merchant's enrollment with the taxation system.

Substep(f) For the order total or for each line item, an evaluation is made to determine which if any of the imposable taxes (see substep (c) above) explicitly tax or exempt the product code (see substeps (d) or (e) above). If the order total or line item amount is deemed taxable for an imposable tax, that amount (order total or line item amount) is accumulated.

Substep (g) After evaluating all amounts (e.g., sale totals and/or line item price information) included by the merchant in the transaction, the amount of each imposable tax is determined by applying the tax rate to the appropriate accumulated total.

Substep (h) Based upon the business rules of the merchant, the calculated tax(es) is prepared for return to the merchant in either a summarized (i.e., as a total tax) or brake out format (i.e., including the name of each tax authority and tax applied, and further including information on taxability by jurisdiction category such as national, state/province, county, city, local or other tax authority, for each line item, if applicable).

Figure 11:
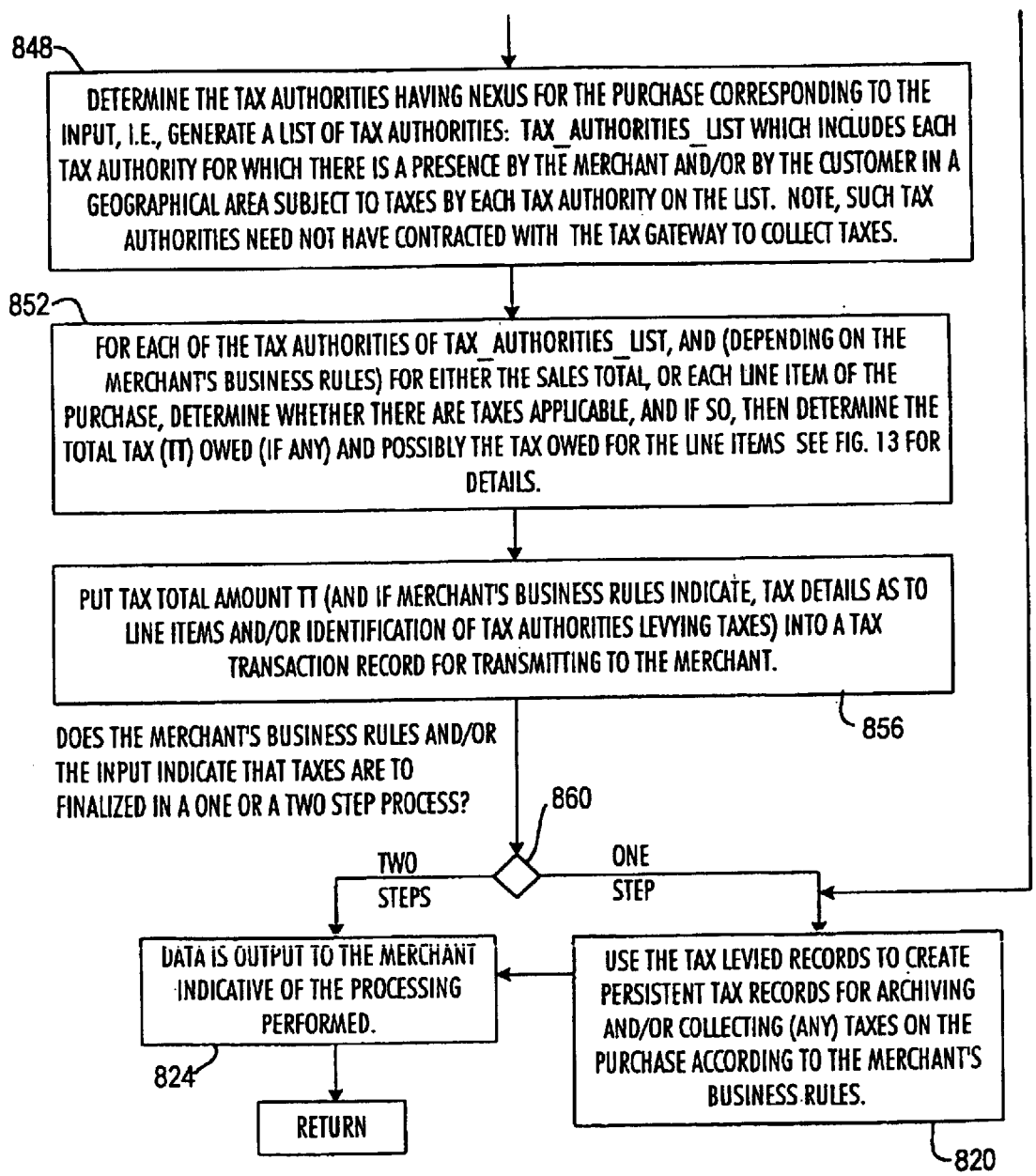
FIGS. 11(1) and 11(2) are high level flowcharts showing the steps performed by the tax computing engine 70 (FIG. 8) when computing the tax(es) on merchant supplied sale transaction data.
Figure 13:
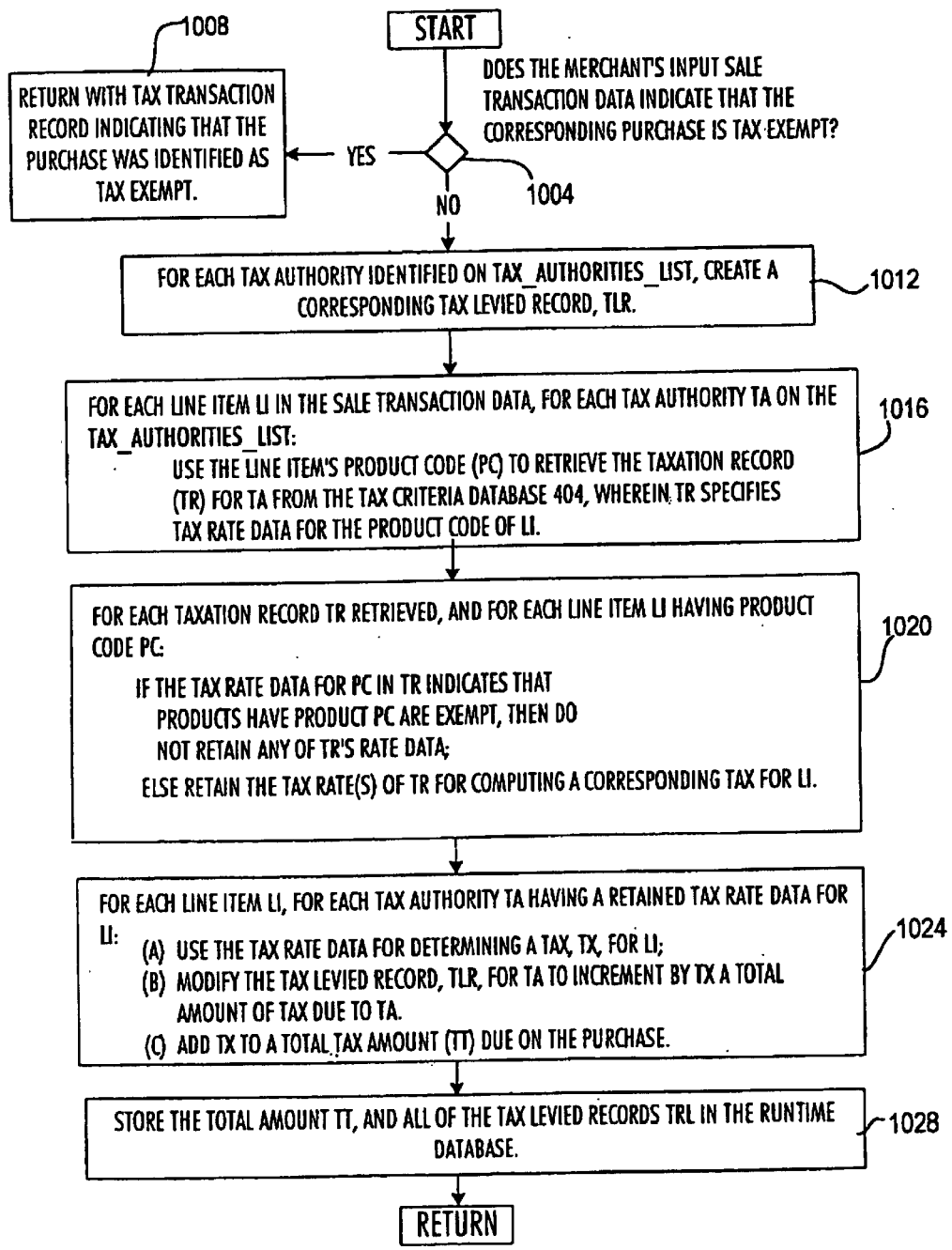
FIG. 13 is a lower level flowchart showing the steps performed in calculating taxes for a merchant input instance of sale transaction data, wherein the taxes can be calculated for various tax authorities.

Note that FIGS. 11 and 13 provide further details regarding step 274.

At step 278, a further determination is made as to whether or not authorization was requested for the credit card transaction. If not, the tax gateway $34_1$ prepares to send only the calculated tax determination to the merchant node $50_1$. However, if authorization of a credit purchase is requested, then at step 282, such authorization is conducted by the tax gateway $34_1$. Subsequently, at step 286, when both (any) credit card authorization and/or calculated tax are completed by the tax gateway $34_1$, this information is returned or communicated to the merchant node $50_1$. In one embodiment, after receipt of the returned information, the merchant node $50_1$ confirms the transmission by returning essentially the same information as the merchant node $50_1$ sent when it made the initial request to the tax gateway $34_1$, except an identifier indicating the status of the merchant's request may be changed from "pro forma" to "confirmed." After the tax gateway $34_1$ receives such confirmation, the tax gateway $34_1$ may (in one embodiment) communicate or report this transaction to the main tax gateway 40 including such information as: the date, the time, the IP (Internet Protocol) address and information (e.g., non-repudiation proof) that such a transaction did occur between the merchant and its customer.

In FIG. 8, a more detailed view of the functional components of one of the gateways 34 and/40 is shown, wherein labels for entities and components described hereinabove that are also shown in the present figure are identically labeled. Accordingly, at least some of the entities and components provided in FIG. 8 have been described above. However, in some cases such previously described entities and components will be further described in the context of the present figure. The following is a description of the components of the tax gateway 32 (or 40) shown in FIG. 8:

(1.1) Tax criteria database 404: This database stores tax rates and the criteria for applying tax rates for various tax authorities. For instance, the tax criteria database 404 contains the tax calculation data that at any point in time is currently applicable to determining transactional taxes, and additionally, also contains tax calculation data that is scheduled to be become effective at specified dates (i.e., the effectuation date of (1.1.3.6) below).

In one embodiment, the following tax data for each of one or more tax authorities may be stored:

(1.1.1) Tax authority identity: Identifies the tax authority with which there is communication with the tax gateway 34 and for which taxes may be collected. Such tax authorities may be countries, states, counties, cities or other taxing entities.

(1.1.2) Tax jurisdiction: A representation of the geographical area that identifies the tax jurisdiction of the tax authority (e.g., a country, state, city name and a list of zip codes and/or other geographical codes such as the U.S. FIPS Geo Code that are included in the tax authority's jurisdiction. Note that for tax jurisdictions of the United States, the U.S. FIPS Geo Code is preferred since this geographical code uniquely identifies each address in the U.S., and there are third party tax jurisdiction data gathering services 408 that associate with each FIPS Geo Code G, representations of the various tax jurisdictions in which the G resides.

(1.1.3) Tax calculation data for the tax authority: This data includes identifications of products taxed or exempted from tax for each tax collected by the tax authority and the tax rate according to the business practices of the merchants (such business practice criteria also denoted herein as "business rules"). For instance, different transactional tax rates may apply depending on whether a merchant includes shipping charges in the price of a product sold, or whether shipping charges are itemized separately. An itemization of some of the business rules, contemplated by various embodiments of the present invention, are provided in APPENDIX A. However, to facilitate the description of the invention, some of business rules captured in the tax criteria database 404 are described as follows:

(1.1.3.1) A first business rule indicating that merchant shipping costs are itemized separately on sales orders. A second business rule indicating that merchant shipping costs are not itemized separately on sales orders.

(1.1.3.2) A first business rule indicating that the sales price of a product includes shipping charges. A second business rule indicating the sales price of all products does not include shipping charges.

(1.1.3.3) A first business rule indicating that sold products are shipped via common carrier. A second business rule indicating that sold products are not shipped via common carrier. Note that a merchant's ability to specify one of the two business rules here is one of the guidelines that the U.S. Supreme Court stated must be followed.

Moreover, for each of one or more products sold by the merchants, various data items are associated and the tax rates are stored as part of the tax calculation data of the tax criteria database 404. An itemization of at least some of these data items is provided in APPENDIX B. However, to facilitate the description of the invention, some of these product specific data items captured in the tax criteria database 404 are described as follows:

(1.1.3.4) Product code: For each product being sold, the product code identifies the product. There may be various embodiments of such a product code as one skilled in the art will understand. In one embodiment, the product code may include a six (6) position value comprised of three (3) distinct parts: product section data identifying a general category for the product (e.g., furniture, vehicles, etc.), product category data identifying a category of products within a product section (e.g., within the furniture product section, home furnishings may be a product category; within the vehicles product section, luxury cars may be a product category, etc.), and product identifier data identifying a more narrow range of products (e.g., within the product category of home furnishings may be a product identifier for beds; within the product category of luxury cars may be a product identifier for luxury sports cars). Note that the product codes are preferably common across all tax authorities. However, it is within the scope of the present invention to utilize different sets of product codes for different tax authorities.

(1.1.3.5) Tax exemption data: For each product code, this data indicates whether the products for the product code are exempt from the taxes of the tax authority.

(1.1.3.6) Effectuation date: The date on which the tax data takes effect for a given product code.

(1.1.3.7) Effectuation area: Data identifying the geographical area in which the tax data takes effect for a given product code.

(1.1.3.8) Tax rounding method: Data identifying how tax amounts are to rounded (e.g., truncated, or rounded up).

(1.1.3.9) Maximum tax collectible: Data indicating, for a given sales transaction, the maximum allowable tax on a purchase of one or more products having a given product code.

(1.1.3.10) Maximum tax per product: Data indicating, for a given sales transaction, the maximum allowable tax on each of one or more products having a given product code.

(1.1.3.11) Maximum total tax: Data indicating, for a given sales transaction, the maximum allowable total tax for a given product code.

(1.1.3.12) Tax rate: Data indicating the default tax rate.

(1.1.3.13) Over maximum tax rate: Data indicating the tax rate when one of the maximums of (1.1.3.7) and (1.1.38) is exceeded.

(1.1.3.14) Override tax rate data: Data indicating whether certain tax data for tax subauthorities (see 1.1.4 below) are to overridden by tax data for the tax authority with which they are associated.

(1.1.4) Data for tax subauthorities: Tax subauthorities are tax regulating entities that are subservient (regarding determining taxes) to the tax authorities for which the present invention may collect taxes. For each such subauthority, the subauthority the tax criteria database 404 includes substantially the same fields as those for the tax authorities; e.g., (1.1.4.1) A representation of the geographical area that identifies the tax jurisdiction of the tax subauthority (e.g., a country, state, county, city name and a list of zip codes and/or other geographical codes such as the FIPS Geo Code that are included in the tax subauthority's jurisdiction.

(1.1.4.2) Tax data for the tax subauthority: For each of one or more product codes, data corresponding to (1.1.3.2) through (1.1.3.10).

Note that the tax criteria database 404 may be updated in various ways and by various entities in order to keep the tax criteria data therein up to date. In one embodiment, a third party tax jurisdiction data gathering service 408 may be used to supply such updates such as DPC located at 42 Melnick Dr Monsey N.Y. 10952-3328. Moreover, in at least some embodiments, the tax authorities themselves can update their own tax calculation data in the tax criteria database 404 as will be described further hereinbelow. Additionally, such updates may be performed on the network 46 or by another means such as by a portable data storage device.

(1.2) Tax criteria archive 412: It is an important aspect of the network taxation system 32 that all outdated tax calculation data from the tax criteria database 404 is archived so that, e.g., tax audits may be more effectively performed, and that particular types of merchant inquiries regarding, e.g., past taxes paid can be replied to promptly. Accordingly, the network taxation system 32 includes a tax criteria archive 412 for retaining such outdated tax calculation data. In particular, the tax criteria archive 412 may be provided with periodic snap shots of the tax criteria database 404. More particularly, the tax criteria archive 412 may be incrementally updated daily with any outdated data (e.g., such data has been superceded with new tax criteria) from the tax criteria database 404, and additionally capture entire snap shots of the tax criteria database on, e.g., a weekly, monthly or other periodic basis. Also, the tax criteria archive 412 may also be at least partially included in a commercially available database management system that provides the capabilities of the tax criteria database 404 and the taxation criteria manager 416 (described hereinbelow). However, due to the continually increasing storage requirements of such data archives, portions (and/or copies thereof) of the tax criteria archive 412 may reside off site. Further note that the in one embodiment, the tax criteria archive 412 may be accessible substantially only from the main tax gateways 34.

(1.3) Taxation criteria manager 416: This subsystem provides the functionality for allowing the tax authorities (via tax authority nodes 60) and/or other authorized parties to modify or update the tax criteria database 404. In particular, the taxation criteria manager 416 includes two subsystems for modifying the tax criteria database 404. The product tax applicability manager 420 which is used for, e.g., changing data in the tax criteria database 404 related to tax rates on products that are independent of the business practices or business rules of the merchants. Thus in one sense, the product tax applicability manager 420 is for assuring that changes to the product tax rate data as shown in APPENDIX B are performed in a manner that maintains the data consistency and integrity of this tax criteria database 404. For example the following functions are performed:

(1.3.1) management of product taxability for the taxes imposed by a tax authority. Product taxability management allows a product or product group to be marked as explicitly taxable or explicitly tax exempt. In addition, by naming tax code related data (in the tax criteria database 404) with a name such as "Sales Tax" or "Use Tax" makes such tax code related data a default for use in calculating the particular type of tax identified by their name. Note that the naming convention described here can be used to specify that all products are identified by the name "taxable" and accordingly default to being taxable. Note that the invention uses a classification system for identifying products that is comprised of three tiers; i.e., a product section, a product category and a product identification (which is discussed more fully in other sections herein). Thus, to make an individual product taxable or tax exempt for a tax, the full three tiered value is identified as required. However, to make a group of products taxable or tax exempt, the corresponding product section or product section/product category is identified as required, (1.3.2) assuring that tax rate changes take effect on their designated dates together with the capture of the outdated product tax rate data in the tax criteria archive 412, (1.3.3) assuring that tax rates are correctly identified for each geographical area identifier that defines the jurisdictional boundaries of the tax authority, (1.3.4) assuring that taxation changes to a higher tax authorities is adequately communicated and reviewed. Please see Appendix B for a definition of the data captured and managed for each Tax Authority and Tax Authority Tax Code. Tax Authorities are organized hierarchically. That is, tax authorities do not cross state boundaries. In some States, tax authorities that are hierarchically lower, e.g. a County Tax Authority is lower than a State Tax Authority, are permitted by law to override the higher tax authority's imposed tax rate. When this occurs, the invention notifies the Tax Authority Contact that this situation has occurred. This is achieved because a tax authority that is lower in the hierarchy, such as a county is known to reside within a State. Therefore, if the State's tax rate is being superceded by the County Tax Authority, it is a relatively simple matter to notify the State's Primary Contact via e-mail that this situation has occurred and (1.3.5) assuring that adequate definition is supplied to determine the taxability of shipping charges. Shipping charges are defined to be taxable or tax exempt using a multiple criteria mechanism or a rules based table. For example, a state may explicitly tax exempt shipping charges if (i) the merchant charges shipping costs at it's cost only, and, (ii) the merchant uses a common carrier, and, (iii) the merchant acts as the shipping agent, or, the merchant charges shipping costs at it's cost only and the merchant uses it's own equipment to ship the good(s). In this case, the business rules established by a merchant at, e.g., enrollment can be interrogated and a determination can be made whether the merchant fulfills at least one of the sets of criteria that make shipping costs tax exempt. If the merchant's business rules do not meet any of the criteria, there is always a rule that defaults shipping to either taxable or tax exempt. A default rule is a rule that is always applicable unless superceded.

The taxation criteria manager 416 further includes a business rules manager 424 for maintaining the consistency and integrity of: (a) the business rule data in the tax criteria database 404 (i.e., data such as is shown in APPENDIX A), (b) corresponding business rule programs (illustrated in FIG. 8 as the business tax rule evaluators 428) for operationalizing the business rules depending on, e.g., the business practices that each merchant identifies as a business practice the merchant performs, (c) the tax calculations performed for jurisdictions as determined by the merchant and in accordance with current interpretations of, e.g., U.S. Supreme Court cases on, e.g., network sale tax issues; for instance such the network taxation system 32 may operationalize such court case interpretations in software of one or more tax gateways as follows.

Note that the taxation criteria manager 416 (and its subsystems 420 and 424) may be interactive with authorized tax authorities, via their corresponding tax authority nodes 60, wherein such interactivity is provided by a graphical user interface (GUI) as one skilled in the art will understand. In particular, the taxation criteria manager 416 receives (from personnel at tax authority nodes 60) instructions or commands via the tax authority interaction control system 432 (described hereinbelow) as illustrated by the dashed arrow directed to the manager 416. Additionally, the taxation criteria manager 416 also receives and outputs (from/to personnel at tax authority nodes 60) tax criteria data from, e.g., the tax criteria database 404 via the tax authority interaction control system 432 as illustrated by the double headed arrow between the manager 416 and the system 432. Moreover, the taxation criteria manager 416 also functions (in cooperation with the tax authority interaction control system 432) to restrict the tax calculation data changes that any one tax authority may enter. In particular, such restrictions are for assuring that a given group (G) of one or more tax authorities (or another entity designated by the group) has access only to tax calculation data (and/or corresponding business tax evaluators) that are only applicable to the tax authorities of the group G. Thus, substantially every data item of the tax calculation data in the tax criteria database 404 has permission data associated therewith indicating the tax authority group(s) and any other entities that can access the data item. In particular, the following types of permission data are provided: (a) contact ID's (e.g., passwords) for identifying a person(s) that can contact the network taxation system 32 as a representative of the group G, (b) contact ID permission parameters determine the facilities such a person having the ID can access and functions that can be performed on one or more of the tax gateways 34 or 40 as a representative of the group G, and (c) tax authority affiliation determines the additional (if any) tax authorities for which information access and/or maintenance functions can be performed as determined by the tax authority to whom another tax authority's remittances and reporting are sent, for example in the case where all county tax authorities are included in remittances and reports to the (United States) state of it's jurisdiction, in cases like this, the state's contact has authority to access and maintain the county tax authority's enrollment and tax calculation data while the county's contact only has access to the county's own data. Moreover, it is worth noting that the taxation criteria manager 416, and the tax criteria database 404 may be embodied within a single commercially available database management system such as IBM's DB2/400.

It is important to note, however, that it is not necessary for tax authorities to maintain the tax criteria database 404. In fact, if a tax authority has not contracted with the network taxation system 32, then this tax authority will not have access to such tax gateways 32 and 34, and the taxation criteria for this tax authority may be provided via a third party tax jurisdiction data gathering service 408.

(1.4) Tax authority interaction control system 432: For those tax authorities (or other authorized entities) that are permitted to modify tax criteria data, e.g., how transactional taxes are calculated, the tax authority interaction control system 432 controls and/or provides the communications interface for communicating via the network 46 with such tax authorities (or more precisely, the tax authority nodes 60). Thus, the tax authority interaction control system 432 includes a network interface and security subsystem 252B which may be identical to the network interface and security subsystem 252A of the merchant interaction control system 256 mentioned hereinabove. In particular, the network interface and security subsystem 252B provides a secure socket layer (SSL) as part of the network 46 interface with the tax authority nodes 60. Further note that the subsystem 252B may provide encrypted communications using, e.g., public/private encryption keys (e.g., DES, DES3 or IPSEC) and/or an encryption key per tax authority as one skilled in the art will understand. The network interface and security subsystem 252B (and 252A) includes the appropriate modules for transmitting and receiving data from the network 46 according to the network protocols supported by the network 46. Thus, if the network is the Internet (or portion thereof), then TCP/IP as well as other protocols such as http, html, and FTP may be supported as one skilled in the art will understand.

In addition, the tax authority interaction control system 432 includes a graphical user interface (GUI) controller 436B (which may be substantially identical to the graphical user interface (GUI) controller 436A of the merchant interaction control system 256). In particular, the graphical user interface controller 436B provides the appropriate responses (e.g., Internet page displays), and sequences of responses for allowing users at the tax authority nodes 60 to effectively interact with one or more of the gateways 32 and/or 40 for accessing and/or modifying tax criteria data for which the user can validate that he/she has the appropriate permissions to do so. Thus, the GUI controller 436B may include (or access) a database (not shown) having the various GUI display screens for outputting to the tax authority nodes 60.

(1.5) Tax authority permission system 440: This system provides one or more additional layers of security (beyond that of the secure sockets layer of the network interface and security subsystem 252B). In particular, the tax authority permission system 440 is for assuring: (a) the validity of a user attempting to access one of the tax gateways 34 or 40, and (b) that a valid user has the proper permissions to perform the actions that he/she requests. Note that it is particularly important to have a multilevel, robust, hacker proof permissions system for the tax authorities interface to the network taxation system 32 in that an illicit user could potentially divert large amounts of tax revenue for his/her personal gain. Accordingly, for various embodiments of the tax authority permissions system 440, the following types of permissions and techniques for implementing such may be provided:

(a) A system assigned contact ID requiring case sensitive entry.

(b) A periodic replacement of the digital certifications described hereinabove.

(c) A periodic monitoring of maintenance activities and e-mailed verifications. Through the use of historical change tracking on key data, when changes are made the primary contact ID, whose e-mail address is part of the enrollment, can be sent a confirmation message. In addition, a notification concerning future dated changes that are due to take effect in the near term can be sent to the primary contact ID's e-mail address.

Thus, the tax authority permission system 440 receives user permissions data (e.g., permission requests, login identifiers, passwords, etc.) from the tax authority interaction control system 432, and returns primarily control flow information (as illustrated by the dashed arrow outwardly directed from the tax authority permissions system 440) indicating, e.g., whether the user is authorized to perform the actions that have been requested.

(1.6) Tax authority nodes 60: Such nodes may not be considered as network 46 nodes that are dedicated solely to perform tasks directed to calculating and/or collecting transactional taxes, since, e.g., they may be used to access other network 46 sites (e.g., Internet websites). However, at least in some embodiments of the network taxation system 32, there may be modules residing at the tax authority nodes 60 that are dedicated to performing tasks specific to the present invention. In particular, the following invention dedicated modules may reside at one or more of the tax authority nodes 60:

(a) Tax audit data selection and extraction tools, such as: a web based mechanism to enter selection criteria representing one or more merchants for a designated period of time and designating a selected set of available fields, either in detail or in aggregation, and delivered to the requestor by a selected method such as in a file sent over the Internet or by a file transfer mechanism such as FTP.

(b) Tax audit data investigation tools, such as a set of automated tools residing at the tax authority node 60 that operate at a detail or aggregated level on data derived from (a) hereinabove. That facilitate further manipulation of said data by providing subset selections using one or more fields with one or more or a range of values and returning in detail or aggregation, additional fields from the data provided by (a) hereinabove based upon the previous subset selections.

(c) Tax report electronic feed receiver functions, such as a set of tools residing at the tax authority node 60 that perform automated processes to request and receive established reports, in an electronic (i.e., not paper or other printed medium) format, provided from the data residing on the main tax gateway 40 and prepared periodically at the main tax gateway 40. Such tools would only operate through the tax authority interaction control system 432 but would relieve employees of the responsibility and effort.

(1.7) Tax authority enrollment system 90: This system communicates with the tax authority interaction control system 432 for enrolling a new tax authority to use the services of the network taxation system 32. Note that both tax authority enrollment data (shown as a solid double headed arrow) and control flow commands (shown as a dashed double headed arrow) may be exchanged with the tax authority interaction control system 432. At a high level the functionality of the tax authority enrollment system 90 has been described hereinabove with reference to FIG. 3. However, the following additional features of the tax authority enrollment system 90 are important to note:

(a) Address verification is performed for the main tax authority location and such verification (without address enhancement) must succeed for enrollment to succeed.

(b) Additional tax authority contacts can be authorized by a tax authority assigned primary contact, wherein such additional contact personnel may perform all functions assigned to the Primary Contact.

(c) Bank account management facilities ensure correct account usage. That is, tax authority representatives have the mechanisms to add new bank(s) as necessary and to activate them (i.e., post a prenote) to effect which account will receive payments. Bank accounts no longer used can be inactivated to deleted from use by the present invention.

(1.8) Merchant interaction control system 256: This system may be substantially the same as the tax authority interaction control system 432 except that instead of providing tax related communication to the tax authorities, the system 256 provides tax related communication with the merchants via merchant nodes 50. Moreover, the GUI controller 436A at least accesses (or includes) a collection of interactive GUI displays that are for merchants rather than tax authorities. Thus, the GUI controller 436A provides the interactive displays that are presented at the browsers 52, and receives user responses from the browsers 52. Moreover, it should be noted that the GUI controller 436A, through various merchant inputs received, is able to activate various capabilities of the tax gateway 34 or 40. For example, merchant input to GUI displays may cause the GUI controller 436A to activate and/or initiate communication with: (a) the merchant enrollment system 444 (described hereinbelow) for enrolling merchants with the network taxation system 32, (b) the address verification system 448 for verifying and/or enhancing the accuracy of an address input by a merchant, (c) the tax computing engine 70 and/or (d) the merchant permissions system 452 (described hereinbelow) for authenticating a merchant transmission and/or authorizing a merchant request for services. Further included in the system 256 is the network interface and security 252A, which as discussed hereinabove is substantially identical to the network interface and security 252B. Thus, as shown in FIG. 8, substantially all communication with the merchant nodes 50 (whether via the browsers 52 or via the plug-in 82 to the merchant's ecommerce engine/server 86, or via a version of the tax agent subsystem 48 that is an adjunct to the merchant's off-line sales transaction system) goes through the network interface and security 252A prior to being routed by the merchant interaction control system 256 (or initiating activation of) the GUI controller 436A, or the tax computing engine 70.

Figure 14:
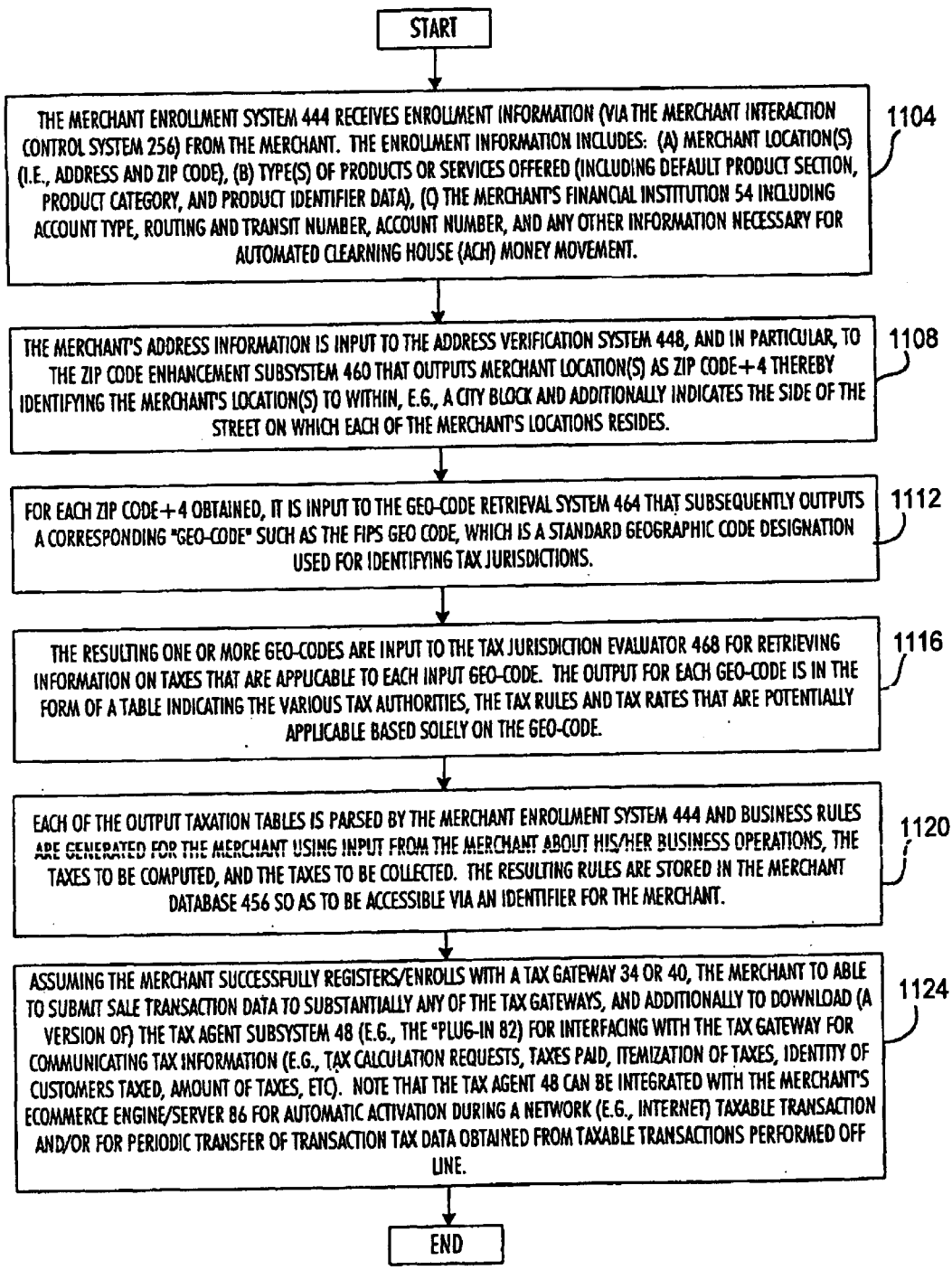
FIG. 14 is another high level flowchart of the steps performed for enrolling/registering a merchant with the present invention.

(1.9) Merchant enrollment system 444: This system communicates with the merchant interaction control system 256 for: (a) enrolling a new merchant to thereby use the tax calculation and/or tax collection capabilities of the present invention, and (b) modifying a currently enrolled merchant's enrollment information such as merchant location(s), merchant contact personnel, business rules the merchant indicates should be used in calculating taxes on sales transactions, and/or the types of customer 44 address verification the merchant requests. Note that both merchant enrollment data (shown as a solid double headed arrow) and control flow commands (shown as a dashed double headed arrow) may be exchanged with the merchant interaction control system 256. At a high level the functionality of the merchant enrollment system 444 has been described hereinabove with reference to FIGS. 5 and 6. Additionally, further information regarding the steps performed by the merchant enrollment system 444 are also illustrated in FIG. 14 described hereinbelow. However, the following additional features of the merchant enrollment system 444 are important to note:

(a) The merchant enrollment system 444 accesses the merchant database 456 (described hereinbelow) for entering information on a newly enrolled merchant and/or modifying enrollment information of a currently enrolled merchant (including de-enrolling a merchant).

(b) It is an aspect of the present invention that each merchant (during enrollment and subsequent thereto) can specify various business practices (referred to herein as business rules) that relate to: (i) the tax authorities for which the merchant desires taxes be determined and/or collected, and/or (ii) the business practices performed as they relate to tax rates. Accordingly, the merchant enrollment system 444 allows each enrolled or enrolling merchant to identify one or more predetermined business rules that should be used in determining the taxes on sales transactions which the merchant submits to the network taxation system 32. Accordingly, the merchant enrollment system 444 may receive tax criteria information from the tax criteria database 404 that indicates what the current collection of business rules are from which the merchant may select. As an alternative embodiment, note that the business rule data in the tax criteria database 404 can be retained in the merchant database 456 instead of or in addition to the business rule data being in the tax criteria database 404. Thus, in this alternative embodiment, the merchant enrollment system 444 may access this information as well from the merchant database 456. Additionally note that when the business rules change, the merchant enrollment system 444 may provide email notices to the enrolled merchants alerting them of the change.

(1.10) Address verification system 448: This system verifies customer addresses and enhances addresses so that, e.g., the proper tax jurisdictions and tax rates can be subsequently calculated by the tax computing engine 70 (described further hereinbelow). Note that the system 448 includes a zip code enhancement system 460 for, e.g., receiving an address having a five digit zip code and subsequently returning an enhanced zip code having four additional digits (denoted herein as "zip+four"). Additionally, the address verification system 448 includes a geo-code retrieval system 464, wherein this latter system receives the enhanced zip+four as input, and determines a geographical code that can be used to determine tax authorities that have jurisdiction for a sales transaction. In one embodiment, the preferred geographical code is the FIPS Geo Code (for addresses in the U.S.). Note that FIG. 10 further describes the steps performed by the address verification system 448, and in particular, for validating and enhancing addresses to obtain the zip+four enhancements. The address verification system 448 is activated by and provides zip+four address output to: (a) the GUI controller 436A in response to a merchant node 50 request for an address verification, (b) the merchant enrollment system 444 for determining the geo-code(s) for each enrolled merchant's location(s) so that such geo-code(s) can be input to the tax jurisdiction evaluator 468 (described hereinbelow) for determining the tax authorities that have jurisdiction over the merchant's location(s), and (c) the tax computing engine 70, wherein this engine determines, for each received sales transaction, one or more geo-codes (via activation of system 464) for the addresses associated with the sales transaction that are pertinent to tax calculation.

(1.11) Tax jurisdiction evaluator 468: This evaluator receives an input geo-code and outputs the tax authorities having taxation jurisdiction over the geographical location corresponding to the geo-code. To determine such outputs the tax jurisdiction evaluator 468 queries the tax criteria database 404 for geo-code associations with tax authority identities. This evaluator 468 is activated by the: (a) the merchant enrollment system for determining the tax authorities for which, e.g., a newly enrolled merchant has nexus (these determinations subsequently being stored in the merchant database 456 so that they are accessible by the tax computing engine 70), and (b) the tax computing engine 70 for determining, e.g., the tax authorities having tax jurisdiction over a customer address for sales transaction wherein the sold product is delivered to the customer address.

Figure 9:
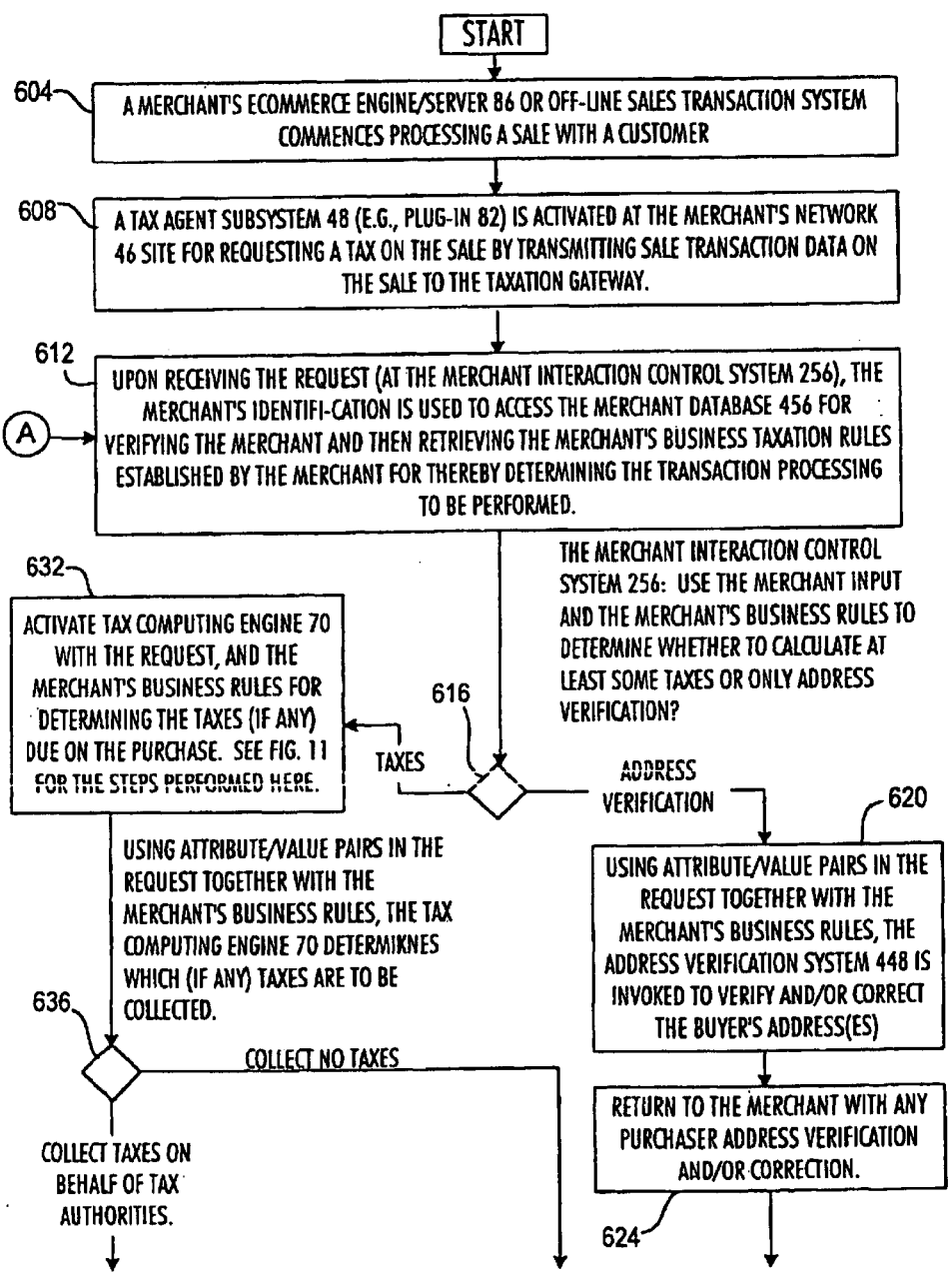
FIGS. 9(1) and 9(2) are high level flowcharts showing the steps performed when the tax gateway 34 or 40 of FIG. 8 processes a merchant taxation request.
Figure 9:
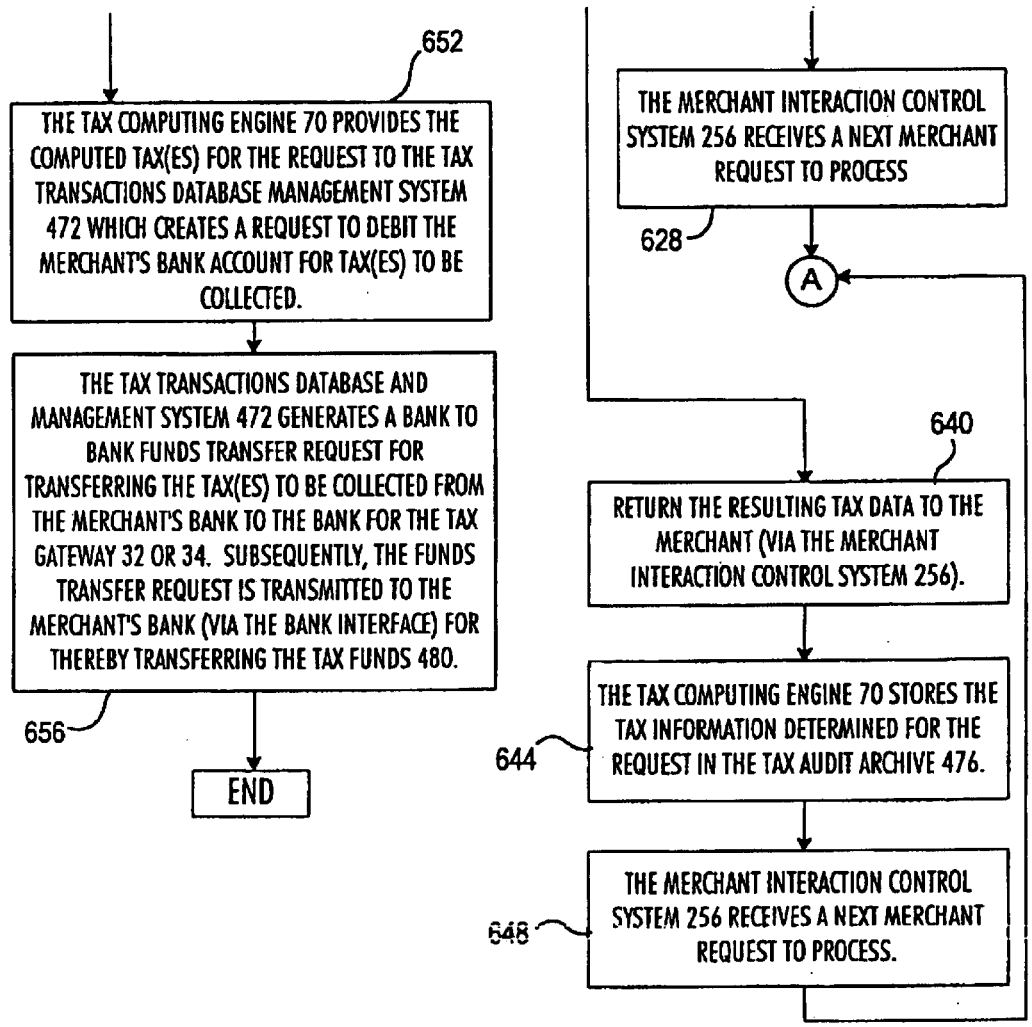

(1.12) Tax computing engine 70: This engine calculates taxes from sales transaction data supplied by the merchants. That is, given a sales transaction data for a particular transaction between an enrolled merchant and a customer 44, the tax computing engine 70 determines the taxes due that are consistent with the business rules that the merchant has specified. Thus for an input instance of data for a sales transaction, the tax computing engine 70 accesses the merchant's business rules record from the merchant database 456, and uses the business rules identified therein as applicable to invoke the corresponding business tax rule evaluators 428. Additional steps performed by the tax computing engine 70 are illustrated in FIG. 9 (which describes the high level steps performed by the tax gateway 34 or 40 for determining the taxes for a sales transaction), FIG. 11 (which describes the steps performed by the tax computing engine 70 when computing the taxes for a given sales transaction), FIG. 12 (which describes lower level steps performed by the tax computing engine 70 when determining the product code for each line item of a sales transaction), and FIG. 13 (which describes additional steps performed by the tax computing engine 70 when determining the taxes owed on each line item of a sales transaction). Note, that the tax computing engine 70 may be activated interactively from a merchant node 50 by the GUI controller 436A. Moreover, note that this may be the primary method for activating the tax computing engine 70 for those merchants having (what has been described hereinabove as) an off-line sales transaction system together with a version of the tax agent subsystem 48 (e.g., merchant $50_2$ FIG. 8). Alternatively, the tax computing engine 70 may be activated directly by the merchant interaction control system 256 independently of the GUI controller 436A in the case that an instance of sales transaction data is received without human interaction via the tax gateway plug-in 82.

Additionally, note that the tax computing engine 70 provides a number of outputs. They are: (a) an output to the requesting merchant wherein the computed tax is provided for received sales transaction data (via one of: the merchant interaction control system 256 or the GUI controller 436A), (b) an output of taxes to be collected to the tax transactions database and management system 472 which is a data repository for taxes that is to be collected by the network taxation system 32 of the present invention, (c) an output to the tax audit archive (of merchant transactions) 476 of records corresponding to substantially all data for each sales transaction instance received together with its corresponding computed taxes.

(1.13) Tax transactions database and management system 472: This database and data management system receives data from the tax computing engine 70 identifying taxes to be collected on merchant sales transactions. The tax transactions database and management system 472 transforms the tax data received from the tax computing engine 70 into ACH formatted electronic bank to bank transfer notes. Such ACH notes are subsequently (i.e., substantially immediately, or periodically) provided to the bank interface 480, wherein the bank to bank electronic ACH funds transfers are initiated.

(1.14) Tax audit archive 476: This archive captures substantially all transactions received by the gateway 34 or 40 together with any taxes computed. This archive may be used for tax audits by the tax authorities. Additionally, an enrolled merchant may request various tax reports using the merchant's sales and tax information captured in this archive. In particular, the following tax reports can be generated from the information in the tax audit archive 476: (a) daily collections, (b) Remittances by tax authority by period, (c) Transaction summary reporting by period by tax authority.

(1.15) Bank interface 480: This interface receives tax collection ACH bank to bank note transfer data from the tax transactions database and management system 472, and initiates the money transfers for such notes. In initiating such transfers, for each merchant having taxes to be collected, the bank interface 480 accesses the merchant database 456 to determine the merchant's bank from which accumulated taxes are to be withdrawn, and subsequently initiates an ACH money transfer between the merchant's bank and a bank affiliated with the network taxation system 32. Note that the bank interface 480 may transfer taxes into separate bank accounts for each of the tax authorities for which taxes are being collected. Additionally note that the bank interface 480 also may initiate periodic transfers from the bank accounts of the network taxation system 32 to the banks of the tax authorities for which taxes are being collected. Accordingly, the band interface 480 accesses a tax authority database (not shown) that retains information about each tax authority for which taxes are being collected for thereby retrieving the bank routing information required to perfect an ACH money transfer to the appropriate bank accounts of the tax authorities.

To further describe the processing performed by at least some of the components of the present invention, flowcharts for the actions performed by these components will now be described.

FIGS. 9(1) and 9(2) describe the high level steps performed by the present invention when calculating the tax(es) on a customer 44 purchase of a product from a merchant enrolled with the network taxation system 32. Accordingly, in step 604 of FIG. 9(1) a merchant's e-commerce engine/server 86 commences processing a sale of a product to a customer 44. Note that instead of the sale being via the merchant's e-commerce engine/server 86 wherein the customer 44 is remotely linked to the merchant by the network 46, the customer 44 may instead be interacting with personnel for the merchant wherein the sales transaction information is entered into an off-line sales transaction system (as this term has been described hereinabove). Since in either case (i.e., whether the customer 44 purchases a product via the merchant's e-commerce engine/server 86, or the merchant's off-line sales transaction system), substantially the same steps are performed by the present invention whenever taxes are to be computed by a tax gateway 34 or 40. In step 608, the tax agent subsystem 48 (e.g., a tax gateway plug-in 82) is activated at the merchant's site for requesting tax calculation by a tax gateway 34 or 40. In particular, the tax agent subsystem 48 transmits sale transaction data about the sale to the tax gateway. Subsequently, in step 612, the merchant interaction control system 256 receives the sale transaction data. More particularly, the network interface and security 252A receives the sale transmission data via, e.g., a secure socket layer (SSL) and verifies that the sale transaction data is from an enrolled merchant. In one embodiment, such verification may be performed by the merchant permissions system 452. In another embodiment, such merchant verification may be performed by the merchant enrollment system 444. Regardless of which of the systems 444 and 452 are activated for performing merchant verification, such verification is performed by retrieving the (any) merchant's identification record and associated business rules (that the merchant has selected) from the merchant database 456. Subsequently, in decision step 616, the merchant interaction control system 256 uses the sale transaction data together with the merchant's business rules for determining whether to calculate at least some transactional taxes, or provide only a verification (and/or enhancement) of an address for the customer 44 provided within the sales transaction data. Note that since some of the merchant's business rules may provide certain default types of processing for such sale transaction data, processes for implementing the merchant selected business rules will be performed unless: (a) the sale transaction data has information specifying alternative processing for one or more of the merchant selected business rules, and (b) such business rules permit such alternative processing. Thus, a merchant may select as a business rule that all sale transaction data instances received by the tax gateway 34 or 40 should have all applicable taxes computed. However, the merchant may specify in a given instance of sale transaction data that no taxes are to be calculated, and instead, only the customer's address is to be verified. Further, note that the present decision step of 616 may be performed through the activation of the GUI controller 436A when the sale transaction data (or instance thereof) is provided interactively via the merchants network browser 52, or interactively via some version of the tax agent subsystem 48 which is used as an adjunct to the merchants off-line sales transaction system. Alternatively, decision step 616 may be performed independently of the GUI controller 436A when an instance of the sale transaction data is provided automatically via the tax gateway plug-in 82.

If, in step 616, it is determined that only address verification need be performed for the present instance of sale transaction data, then step 620 is performed. In this step: (a) the appropriate attributes/value pairs of the network 46 transmitted sale transaction data instance that are related to address data to be verified, and (b) the appropriate merchant business rules related to address verification are used to activate the address verification system 448 for thereby verifying and/or correcting one or more addresses in the sale transaction data instance. Note that further detail as to how address verification is performed is described herein below in reference to FIGS. 10(1) and 10(2). However, it is worth mentioning here that various levels of address verification may be performed depending on the address input of the attribute/value pairs and the merchant's business rules. Thus, a merchant may request that only an address status be returned indicating whether an input address is valid or invalid. Alternatively, the address verification system 448 may return one or more statuses indicating the likely validity of certain address fields within an address. Additionally, substitute addresses may be provided in certain contexts as will be discussed hereinbelow regarding FIGS. 10(1) and 10(2). Subsequently following step 620, the address verification results are returned to the requesting merchant in step 624. Then, in step 628 the merchant interaction control system 256 prepares for receives a next merchant request to process. Thus, when a next merchant request is received, step 612 is again performed by the merchant interaction control system 256.

Referring again to step 616, if it is determined that at least some taxes are to be calculated for the present instance of the sale transaction data, then step 632 is performed wherein the tax computing engine 70 is activated with (the appropriate portions of) the merchants request and the merchant's business rules for thereby performing and/or collecting taxes for the purchase to which the current instance of the sale transaction data corresponds. Note that the processing performed in the present step is further described hereinbelow and in the flowcharts of FIGS. 11(1) and (2). Subsequently, in decision step 636, the tax computing engine 70 determines which (if any) taxes are to be collected by the network taxation system 32 of the present invention. If no taxes are to be collected, then step 640 is performed wherein the information related to any tax(es) calculated by the tax computing engine 70 is returned to the merchant. Additionally, in step 644 (which may be performed prior to or substantially concurrent with step 640), the tax computing engine 70 stores in the tax audit archive 476 a tax record having the tax(es) (if any) calculated and an indication that such taxes were not collected. Subsequently, in step 648, the merchant interaction control system 256 receives a next available merchant transaction to process. Thus, once such a merchant request is received, step 612 is again performed with this new request.

Returning now to step 636, if this step determines that taxes are to be collected on behalf of one or more tax authorities, then step 652 is performed wherein the tax computing engine 70 provides the computed taxes to be collected to the tax transactions database and management system 472, wherein this latter system creates a request for debiting the merchant's bank account for the taxes to be collected. Subsequently, step 656 may be performed asynchronously with the steps 640 through 648, wherein in step 646 the tax transactions database and management system 472 generates a bank to bank ACH funds transfer request for transferring the tax(es) to be collected from the merchant's bank account to a bank account for a bank associated with the network taxation system 32 for receiving such collected taxes. Additionally, note that the request for transferring the tax collection funds is transmitted to the merchant's bank via the bank interface 480 for thereby transferring the tax owed by the merchant to the gateway bank 125 for the network taxation system 32.

Figure 10:
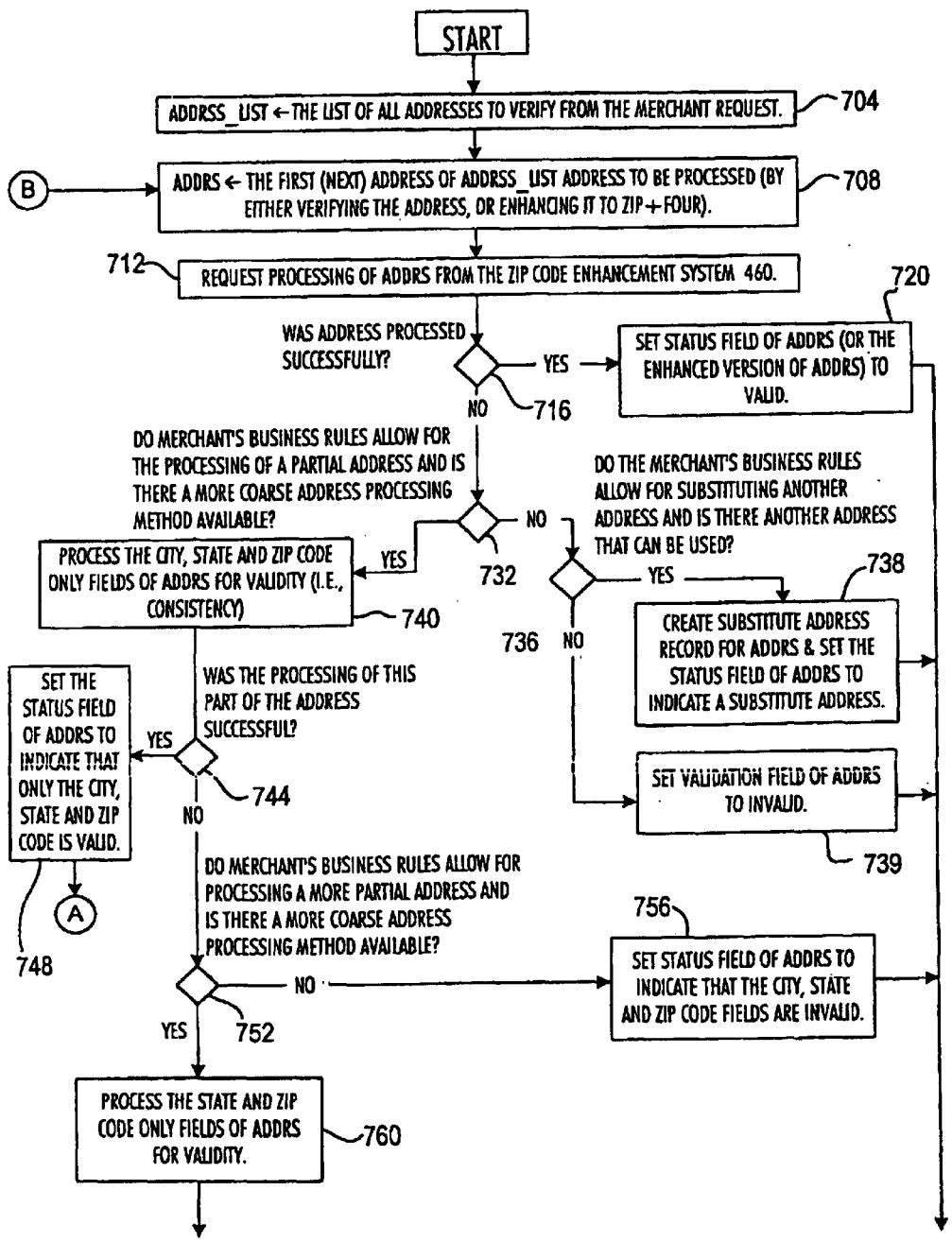
FIGS. 10(1) and 10(2) are high level flowcharts showing the steps performed for verifying and/or enhancing an address so that whenever possible at least four additional digits are added to the zip code.
Figure 10:
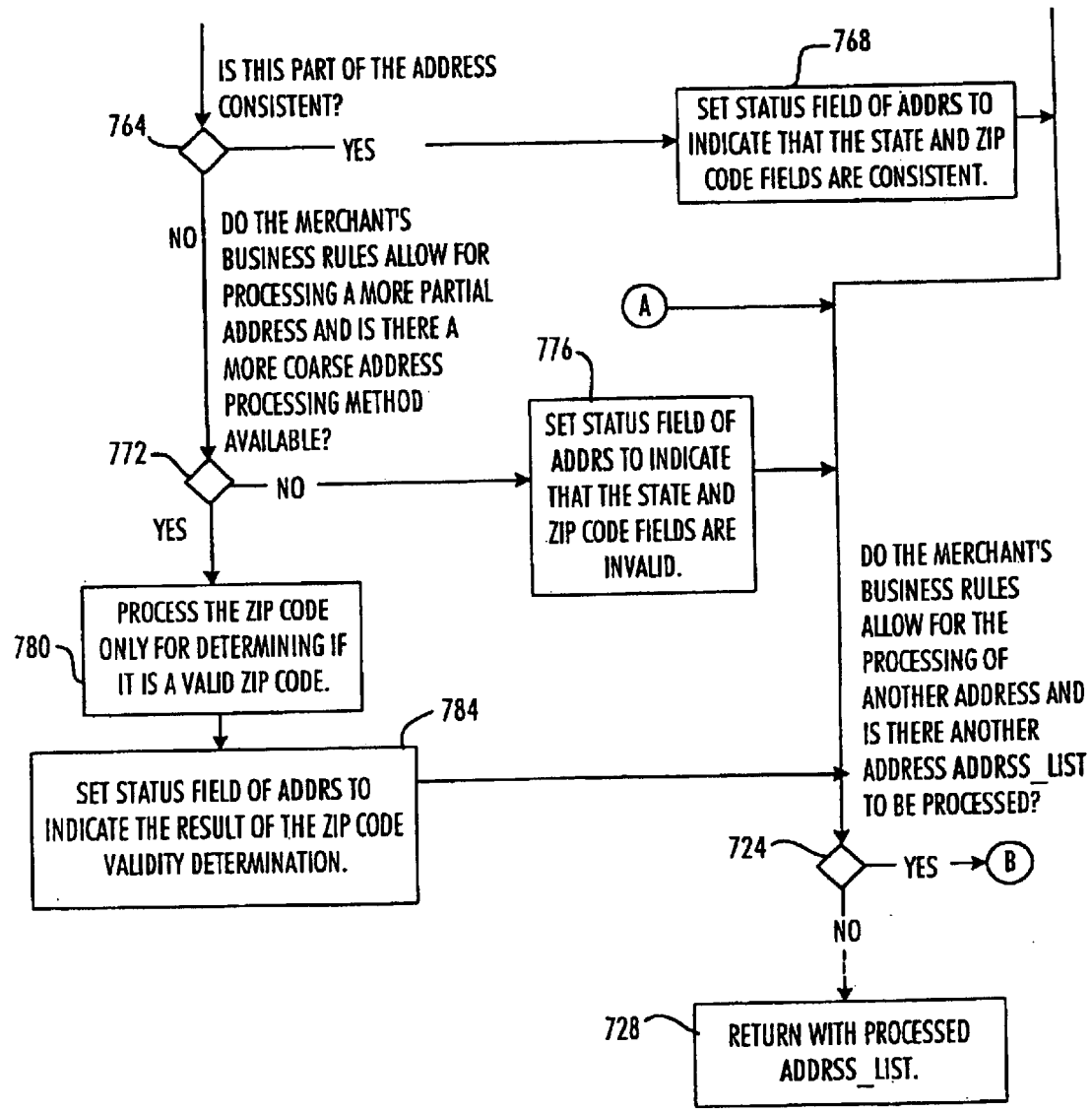

Referring now to FIGS. 10(1) and 10(2), these figures describe the high levels steps performed by the address verification system 448. Accordingly, in step 704, the variable ADDRSS_LIST receives as its value a list of all addresses to verify from the merchant request data provided to the address verification system 448 by the merchant interaction control system 256 (e.g., via step 620 of FIG. 9(1)). Subsequently, in step 708, the first address to be validated in the address list of ADDRSS_LIST is assigned to the variable ADDRS for subsequent processing. Note that in at least some embodiments of the present invention, ADDRSS_LIST references only a single address to be verified and/or enhanced. In particular, the tax agent subsystem 48 at a merchant node 50 may specify the one or more addresses to verify and/or enhance. Thus, at least some versions of the tax agent subsystem 48 may include tax processing capabilities sufficient to determine which of one or more addresses supplied by a customer 44 and/or the merchant is to be transmitted to the present invention for use in determining taxes. Further note that in one embodiment, addresses may be enhanced to provide zip+four as described hereinabove. Subsequently, in step 712, the address verification system 448 activates the zip code enhancement system 460 for thereby enhancing the address corresponding to ADDRS to a zip+four address. Note that the zip code enhancement system 460 may use a commercially available database system of which there are a number of providers or vendors for such address enhancing capabilities. In particular, it is preferred that the zip+four address enhancement capabilities of the present invention be certified (at least in the United States) by the United States Postal Service Coding Accuracy Support System (CASS), as one skilled in the art will understand. Subsequently, in decision step 716, a determination is made as to whether the address of ADDRS was processed successfully in step 712. If so, then step 720 is performed wherein a status field is set which indicates that the input and address and/or the enhanced version of the input address appears to be valid. Note that depending upon the merchant's business rules, and the subsequent processing to be performed after address verification and enhancement, different outputs may be provided by the present flowchart. For example, the original input address of ADDRS may be output with merely a status field indicating whether the address is valid or invalid, or the enhanced address may be output (as a new value for ADDRS) wherein the status field indicates that ADDRS contains a valid address. Subsequently, in decision step 724, a determination is made as to whether the merchant's business rules allow for the processing of another address and additionally a determination is made as to whether there is another address to be processed that is referenced by ADDRSS_LIST. In particular, note that an address to which a customer wishes a purchased product to be delivered may be different from an address to which the customer desires to be billed, and if the merchant's business rules may specify that without further instruction within an instance of sale transaction data, that only the address where the product is to be delivered should be used for tax calculation purposes, then it may be possible for one or more addresses on ADDRSS_LIST not to be processed for address verification and/or enhancement. Accordingly, if there are no other addresses to be verified and/or enhanced, then step 728 is performed wherein the addresses of ADDRSS_LIST are returned together with a status field for at least each address processed, wherein the status field indicates whether the (possibly enhanced) address therein is valid. Alternatively, if in step 724, it is determined that there are additional addresses to be processed, then step 708 and subsequent steps are performed with the next address from ADDRSS_LIST that is consistent with merchant's business rules.

Returning now to step 716, if the zip code enhancement system 460 could not successfully process the address in step 712, then decision step 732 is encountered wherein a determination is made as to whether the merchant's business rules allow for the processing of a partial address, and additionally, whether there is a more course address processing method available. That is, the merchant may specify a business rule that some portion of the address of ADDRS may be further processed for determining if the portion is at least consistent with addresses that are known to exist. For example, the address portion may be the city, state and zip code fields only. If the outcome to step 732 is negative, then step 736 is performed wherein a determination is made as to whether: (a) the merchant's business rules allow for substituting another address for ADDRS, and (b) there is another appropriate address available. Note that such a substitute address may be a location for the merchant. If the result of step 736 is positive, then step 738 is performed wherein the substitute address replaces the original address of ADDRS, and the status field for ADDRS is set to indicate that a substitute address has been provided. Alternatively, if the result of step 736 is negative, then in step 739 the status field for ADDRS is set to indicate that the address therein is invalid and subsequently steps 724 and beyond are performed.

Alternatively, if the result from decision step 732 is positive, then step 740 is performed wherein the city, state and zip code fields of ADDRS are processed to determine if the combination of these fields is consistent with addresses that are known to exist. Thus, in decision step 744, a determination is made as to whether the verification of this part of the address in ADDRS is successful. If so, then step 748 is performed wherein the status field for ADDRS is set to indicate that only the city, state, zip code is valid. Subsequently, steps 724 and beyond are performed.

Returning now to step 744, if the city, state, zip code portion of the address did not match any addresses known by the address verification system 448 to exist, then decision step 752 is encountered wherein a determination is made as to whether the merchant's business rules allow an attempt to validate a further partial portion of the address ADDRS, and, whether such a further course processing method is available to the address verification 448. Accordingly, if the result from this decision step is negative, then step 756 is performed wherein the status field for ADDRS is set to indicate that the city, state, and zip code fields do not match any known addresses (i.e., are invalid). Accordingly, steps 724 and beyond are then performed. Alternatively, if step 752 results in a negative result, then step 760 is performed wherein a request is made (e.g., to the zip code enhancement system 460) for determining the consistency of the state and zip code only portions of ADDRS. Subsequently, in step 764, a determination is made as to whether the state and zip code fields are consistent with addresses known to exist. If so, then in step 768, the status field for ADDRS is set to indicate that only the state and zip code fields are consistent. Alternatively, if the outcome from step 764 is negative, then step 772 is performed wherein a determination is made as to whether the merchant's business rules supports even a more course address verification processing, assuming such a more course method is available. If the result from step 772 is negative, then step 776 is performed wherein the status fields for ADDRS is set to indicate that the state and zip codes fields are not consistent with one another. Alternatively, if the result from decision step 772 is positive, then step 780 is performed wherein only the zip code portion of the address of ADDRS is processed to determine if this zip code matches a known zip code. Subsequently, in step 784, the status fields for ADDRS is set to indicate the results of the zip code validity determination of step 780. Following this latter step, steps 724 and beyond are again performed.

FIGS. 11(1) and 11(2) provide many of the high level steps performed by the tax computing engine 70 for calculating taxes on an instance of sale transaction data received from a merchant. In particular, the steps of FIGS. 11(1) and 11(2) are performed when step 632 of FIG. 9(1) is encountered. Accordingly, in step 804 of FIG. 11(1), the tax computing engine 70 receives sale transaction data input from the merchant interaction control system 256 about a taxable merchant transaction. In particular, the following information is supplied to the tax computing engine 70: the merchant's network taxation system 32 identification (i.e., ID), the classifications of the products (which includes services herein) purchased (i.e., such a classification may be the product code as defined hereinabove), one or more addresses related to the purchase, and optionally, for each line item of products being purchased, the following information may also be provided if available: a stocking unit identification (SKU), the quantity of the product being ordered, and the "extended price" (i.e., the unit price times the quantity of the product). Further, note that the one or more addresses received as input to the tax computing engine 70 may be the customer's location (address and zip code if available), the address of where the purchased product(s) is to be delivered, and/or the customer's billing address. Subsequently, in step 808, a determination is made as to whether the current input to the tax computing engine 70 is a request to finalize the tax(es) for a purchase wherein the tax(es) was determined in a previous activation of the tax computing engine 70. In particular, note that it is an aspect of the present invention to determine (if so instructed) taxes on a particular purchase via a two step process, wherein a first transmission of sale transaction data is provided to the tax gateway 34 or 40 for determining tax(es) without finalizing the tax determination, and subsequently performing a second step of finalizing the transaction and thus, the tax(es) calculated for the purchase in response to a second transmission from the merchant. Note that a tax calculation is not finalized according to the present invention unless it is calculated and at least the results stored in the tax audit archive 476. Additionally, note that such a sales tax determination is also not finalized if the merchant's business rules indicate that the determined tax(es) (or a portion thereof) are to be collected and no such processing for collection (e.g., via the tax transactions database and management system 472) has been performed. Accordingly, under certain conditions, the merchant may elect to have the taxes on a purchase calculated and returned to him/her without any further steps being performed for finalizing the sales tax for the transaction. Thus, the merchant may subsequently provide another transmission of sales transaction data corresponding to the same transaction so that the tax gateway 34 or 40 may then finalize the tax process. This two-step approach to finalizing taxes is particularly beneficial for e-commerce sales transactions performed on the network 46 in that it is well known that a substantial number of potential purchases of products by customers 44 may be aborted or abandoned after substantially all price determinations have been performed. Accordingly, using this two-step approach to finalizing sales taxes allows the merchant to provide a total purchase price, including tax(es), to a customer 44 prior to finalizing the tax(es) for the transaction. Thus, once the customer has actually committed to a purchase, then the merchant can effectively retransmit the sales transaction data for the purchase so that the tax(es) calculated by the preceding process can be finalized. Accordingly, in step 808, a determination is made as to whether the current input to the tax computing engine 70 corresponds with the second step of the two step finalization of tax(es) on a purchase. If the present input is indeed a request for finalizing a previously computed tax(es), then step 816 is performed wherein the previously computed tax results are retrieved from a runtime database utilized by the tax computing engine 70. Subsequently, in step 820, the retrieved one or more records for the previously computed taxes (these records denoted here as the "tax levied records") are used to create persistent tax records for archiving in the tax audit archive 476, and additionally, if the merchant's business rules specify, collecting at least some portion of the taxes calculated. Subsequently, in step 824, data is output from the tax computing engine 70 indicating the processing that has been performed, which in the present context is the finalizing the taxes on a purchase.

Returning again to step 808, if the current input to the tax computing engine 70 is not for the completion of a tax process previously initiated on a prior transmission to the tax gateway, then step 828 is performed, wherein the attributes/value pairs in the input (such pairs being typical of data formats used by transmissions on networks such as the Internet as one skilled in the art will understand) together with the merchant's business rules are used by the tax computing engine 70 to invoke for activate the address verification system 448 to verify, correct, and/or enhance the addresses provided in the input to the tax computing engine. Note that in performing the present step, the steps of the flowchart of FIG. 10 are performed. Subsequently, a determination is made in step 832 as to whether the address verification (and/or enhancement) succeeded in accordance with merchant's business rules. If not, then step 836 is performed wherein a tax computation error message is generated and returned to the merchant via the merchant interaction control system 256. Alternatively, if the address processing of step 828 succeeded, then step 840 is performed, wherein the merchant's business rules are used to determine the tax calculation method to be used, what to do with the calculated tax results, what if any taxes to collect, and the (if any) taxability criteria to be used in computing the tax(es). In particular, regarding the tax method to be used, at least the following business rules may have been selected for use by the merchant:

(a) always perform tax calculations for the tax authorities selected by the merchant, (b) only perform tax calculations for the selected tax authorities if so specified in a request with sale transaction data from the merchant, (c) calculate the tax(es) on only a total for the corresponding customer purchase, (d) calculate the tax(es) for each line item of a customer purchase separately, Regarding the business rules related to what to do with the calculated tax results, the merchant may have selected business rules from among the following:

(a) automatically complete or finalize each tax process in one step of activating the tax computing engine 70 (instead of the two step alternative approach described hereinabove), (b) require that each sale transaction data instance to be completed or finalized have therein an explicit request to do so, Regarding the business rules related to the taxes to collect, the merchant may have selected the collection be according one of the following business rules:

(a) do not collect taxes for any tax authorities, (b) collect all taxes that can be determined by the present invention, (c) collect the taxes for all states of the United States and any tax authorities for which such states also collect taxes on their behalf, (d) collect taxes for only those tax authorities wherein there is an agreement in place between the network taxation system 32 and such tax authorities for accepting taxes on behalf of merchants via and a ACH electronic transfer of finds.

Regarding the business rules related to taxability criteria, such rules in general relate to business practices of how shipping and handling charges are determined. Note that the business rules identified in this step are merely representative of those contemplated to be used in various embodiments of the present invention. A more complete listing of such business rules and descriptions thereof is provided in APPENDIX A.

Subsequently, in step 844, assuming the merchant's business rules permit and line item transaction data is available, for each line item in the input for a product purchased in the corresponding sale, the product code is determined and stored with data for the line item in the run time data base. Note that the steps for determining line item product codes are described herein below and illustrated in FIG. 12. Subsequently, in step 848, the tax computing engine 70 determines which tax authorities have nexus for the purchase related to the current input. That is, the present step generates a list, TAX_AUTHORITIES_LIST, of tax authorities wherein this list includes each tax authority for which there is a presence by the merchant and/or by the customer making the purchase in a geographical area subject to taxes by the tax authority. Note that the present step is performed by inputting one or more of the enhanced addresses output from step 828 to the geo-code retrieval system 464 to obtain one or more corresponding geo-codes such as the FIPS geo-code, and subsequently using the output one or more geo-codes as input to the tax jurisdiction evaluator 468 for thereby identifying the tax authorities having nexus for the purchase. Thus, once the TAX_AUTHORITIES_LIST has been determined, step 852 is performed wherein for each of the tax authorities identified on the TAX_AUTHORITIES_LIST determine whether there are taxes applicable, and if so, then determine the total tax owed. Note that depending upon the merchant's business rules, taxes and/or exemptions may be determined on each line item of the purchase individually. Moreover, such line item inclusion in taxes or tax exemptions may also be output for both return to the merchant as well as stored in the tax audit archive 476. Additionally, note that the steps performed for calculating taxes for each line item is described hereinbelow and illustrated in FIG. 13. Subsequently, in step 856, at least the total amount of taxes due, and if the merchant's business rules indicate, the taxable amount of each line item for each tax authority tax and/or the identifications of the tax authorities levying taxes, are entered into a tax transaction record for transmitting to the merchant. The tax computing engine 70 subsequently determines in step 860 whether the merchant's business rules and/or the input to the tax computing engine indicate that the computed taxes are to be finalized in a single step or in a two step process as described hereinabove. If it is determined that taxes are to be calculated and finalized in a single step, then steps 820 followed by step 824 are performed. Alternatively, if it is determined that the two step process for completing taxes is to be used, then only step 824 is performed.

Figure 12:
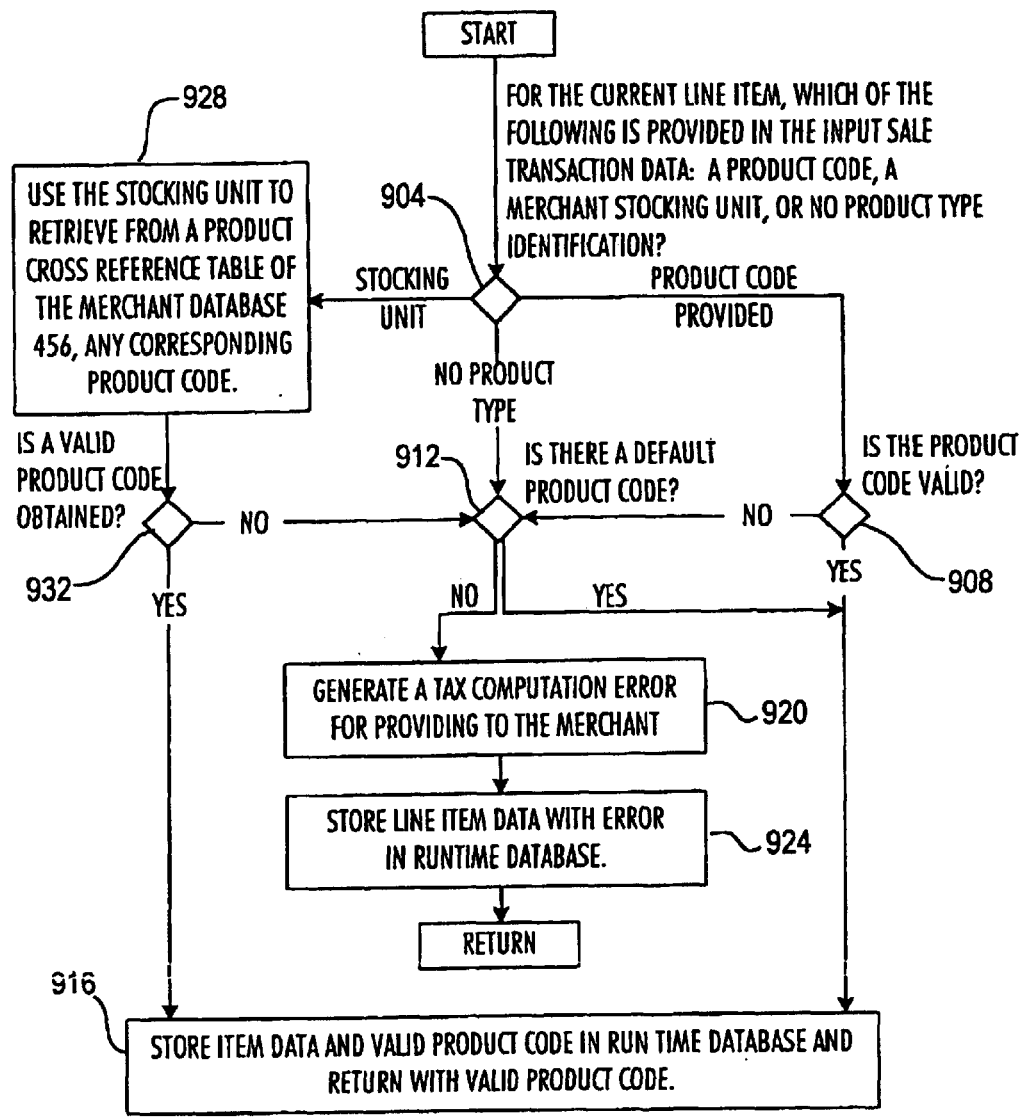
FIG. 12 is a high level flowchart showing the steps performed by the tax computing engine 70 for determining a tax related categorization of a product (or service) corresponding to a line item of an instance of sale transaction data provided by a merchant.

Regarding FIG. 12, this figure provides a flowchart of the processing done by the tax computing engine 70 for determining the product code of a line item in sales transaction data received from a merchant. Accordingly, assuming the input to the flowchart of FIG. 12 includes data representing a line item from an instance of sale transaction data, in step 904 a determination is made as to whether the line item data includes a product code, a merchant stocking unit, or a no product type identification. If a product code is provided in the line item data, then in decision step 908 a determination is made as to whether the product code is valid. Note that such a determination is made by the tax computing engine 70 accessing the tax criteria database 404 with the product code for the line item so that the tax criteria database may determine if the input product code matches a currently valid product code in this database. If the return information from the tax criteria database 404 indicates that the product code entered is invalid, then step 912 is performed wherein a determination is made as to whether there is a default product code which the merchant has established with the network taxation system 32. If so, then step 916 is performed wherein the line item data and the default product code are stored in a run time database accessible by the tax computing engine 70, and the present flowchart then returns to its activation step (e.g., step 844 of FIG. 11) with the default product code. Alternatively, if in step 912, there is no default product code available, then step 920 is performed wherein the tax computing engine 70 generates a tax computation error for providing to the merchant. Subsequently, in step 924, the line item data and the associated error are stored in at least one of an error message database (not shown), the merchant database 456 (wherein the error message is accessible by the merchant's enrollment identification), and the tax audit archive 476. Then a return is then performed to the step from which the present flowchart was activated. Returning now to step 908, if the product code is determined to be valid, then step 916 is again performed for storing the line item data with its valid product code in the run time database prior to returning the valid product code to the step from which the present flowchart was activated.

Returning again to step 904, if there is no product code supplied by the line item data but there is a merchant stocking unit for identifying the product corresponding to the line item data, then step 928 is performed wherein the stocking unit is used to retrieve any corresponding product code for the product of the line item data. In particular, the tax computing engine 70 accesses a product cross-reference table in the merchant database 456, wherein this table associates the merchant's stocking units with corresponding product codes. Thus, the merchant database 456 provides the tax computing engine 70 with an indication as to whether the stocking unit has a corresponding product code for the merchant that has supplied the sale transaction data currently being processed by the tax computing engine 70. Thus, in step 932, the tax computing engine 70 uses a response from the merchant database 456 for determining whether a valid product code is obtained. If so, then step 916 is again performed. Alternatively, if a valid product code is not obtained in step 932, then step 912 is again performed wherein a determination is made as to whether there is a default product code that the merchant has established. Thus, depending on the outcome of step 912, either steps 920 and 924 are performed, or step 916 is performed.

Returning again to step 904, if the line item data does not include any product type identification, then step 912 and subsequent steps are performed as described hereinabove.

Referring now to FIG. 13, this figure provides a flowchart of the high level steps performed when determining taxes applicable to line items of the instance of sale transaction data being processed by the tax computing engine 70. Accordingly, in step 1004 of FIG. 13, a determination is made as to whether the merchant's input sale transaction data indicates that the corresponding purchase is tax exempt. If so, then step 1008 is performed wherein a tax transaction record is created indicating that the purchase has been identified as tax exempt. Thus, since there is no further processing to be performed on the input to the tax computing engine 70 for the current instance of sale transaction data, the present flowchart returns to the step from which it is activated (e.g., step 852 of FIG. 11). However, note the data identifying the current sale transaction data instance together with its tax exempt status is stored in the tax audit archive 476.

Alternatively, if there is a determination in step 1004 that the merchant's input sale transaction data is not tax exempt, then step 1012 is performed wherein for each tax authority identified on the list: TAX_AUTHORITIES_LIST (as described with reference to steps 848 and 852 of FIG. 11), a corresponding tax levied record (TLR) is created. Subsequently, in step 1016, for each line item (LI) in the sale transaction data input to the tax computing engine 70, and for each tax authority (TA) on the TAX_AUTHORITIES_LIST use the line item's product code (PC) to retrieve the taxation record (TR) for the tax authority TA from the tax criteria database 404, wherein the taxation record TR specifies the tax rate data for the product code of the line item LI. Following this, in step 1020, for each of the taxation records TR retrieved and for each line item LI, if the tax rate data of TR for the product code of the line item LI indicates that products having product code PC are exempt then do not retain any of the tax rate data for TR. Alternatively, if the product code PC is not designated as exempt from taxes, then retain the tax rate data of TR for computing a corresponding tax for the line item LI. Subsequently, in step 1024, a tax amount is determined for each line item of the sale transaction data being processed by the tax computing engine 70. In particular, step 1024 performs, for each line item LI, and for each tax authority TA (on the list: TAX_AUTHORITIES_LIST) wherein this tax authorities tax rates were retained in the previous step for the line item LI, the following sub-steps:

Substep (a) Use the tax rate data retained for LI to determine a total tax (TX) for the line item LI. Note that the calculation here may be relatively straightforward if each instance of the tax data used for determining the line item's tax is, e.g., a single rate that is applicable regardless of the quantity of the product sold in the line item, and regardless of the total amount of the purchase price for this line item. However, additional tax criteria can be utilized by the present invention for properly computing taxes for a tax authority. More precisely, the present invention is able to determine proper taxes for products wherein the taxes are based upon substantially any combination of the following data items related to the sale: (i) the location from which the sale takes place, (ii) the location of the customer, (iii) the location of the delivery of the product, (iv) the quantity of the product purchased, and (v) the total dollar amount paid for the product (or line item). Note that in one embodiment, one or more programs may be provided wherein each such program is able to determine the tax for a predetermined one or more types of tax rate data. For example, such a collection of programs may be able to determine substantially all tax rate formulas that produce a tax wherein the variables to the formulas are no more than the above-identified merchant location, customer location, quantity of product purchased, and the total dollar amount for the product. However, it is also an aspect of the present invention to flexibly accommodate additional tax criteria that tax authorities may impose. Accordingly, in one embodiment of the present invention, such line item taxes may be computed symbolically, wherein a high level program representing a symbolic translator may receive one or more translatable statements that can be used by the translator for computing taxes wherein the data fields used in computing the taxes need not be predefined but rather can be assigned values dynamically according to field or column names in records within the tax criteria database 404. Thus, in this latter embodiment, substantially any tax criteria which a tax authority may impose can be computed by the present invention once a high level programmatic translation of the tax code for the tax authority has been provided.

Substep (b) Once the tax for the line item LI has been determined, for a given tax authority TA, the tax levied record (TLR) for the tax authority is incremented by the tax amount computed in sub-step (a) immediately above.

Substep (c) Add the tax amount TX determined in sub-step (a) to a running total tax amount (TT) that is to be the running total of all taxes due on the purchase.

Subsequently, in step 1028, the total amount of taxes due TT and all of the tax levied records TRL are stored in the run time database that is accessed by the tax computing engine 70. Following this last step, a return is performed for transferring the flow of control back to the step from which the steps of the present flowchart were activated.

Referring now to FIG. 14, this figure provides the additional information related to enrolling a merchant in the network taxation system 32 of the present invention. In particular, the present figure provides additional detail for the process of merchant enrollment as also described in FIG. 6. Accordingly, in step 1104 of FIG. 14, once the merchant enrollment system 444 receives a request from a merchant to be enrolled with the network taxation system 32 of the present invention, the merchant enrollment system 444 requests (and to continue the enrollment process receives) the following enrollment information:

(a) the one or more addresses where the merchant is located for doing business (i.e., address, city, state and zip code for the U.S.), (b) data indicating the types of products offered for sale (e.g., including a default product section, product category and product identifier as described hereinabove), (c) identification of the merchant's financial institution 54 from which any taxes to be collected are to be debited. In particular, such information about the merchant's financial institution should include the merchant's account type, the financial institution's routing and transit number, the merchant's account number, and any other additional information necessary for automated clearing house (ACH) money movement. Subsequently, in step 1108, the merchant's address information identifying the merchant's one or more locations for doing business are input to the address verification system 448 for both verifying that such addresses exist, and for enhancing these addresses to zip code +4. Following this, in step 1112, each of the zip code +4 enhanced merchant addresses is input to the geo-code retrieval system 464 for outputting a geo-code such as the FIPS geo-codes which are typically used for indicating tax jurisdiction boundaries. Thus, in step 1116, the resulting one or more geo-codes provided to the merchant enrollment system 444 are subsequently input to the tax jurisdiction evaluator 468 for retrieving information on taxes and/or tax authorities that are applicable to each of the geo-codes identifying one or more merchant locations. In particular, note that for each such geo-code, the output from the tax jurisdiction evaluator 468 may be in the form of a table indicating: (i) the various tax authorities having jurisdiction over the geo-code, and (ii) the tax rules and tax rates that are potentially applicable due solely to the geo-code. Subsequently, in step 1120, each of the output taxation tables from the tax jurisdiction evaluator 468 is parsed by the merchant enrollment system 444 for generating business rules for the merchant. Note that such business rules (as previously described hereinabove) also require input from the merchant regarding the merchant's business practices as they relate to taxable transactions, the taxes that the merchant desires to be computed by the network taxation system 32, and the taxes that the merchant wishes to be automatically collected by the network taxation system. Note that the resulting merchant's business rules are stored in the merchant database 456, wherein such business rules can be retrieved using the enrollment identification for the merchant (which is provided once the merchant is successfully enrolled with the present invention). Finally, in step 1124, assuming the merchant has successfully registered/enrolled with a tax gateway 34 or 40, the merchant may then submit sale transaction data to substantially any of the tax gateways of the present invention thereby to have taxes computed, and optionally automatically collected. Additionally, after successful registration/enrollment, the merchant may download one or more versions of the tax agent subsystem 48 for use in communicating tax related information with a tax gateway of the present invention. Note that as discussed previously, such downloaded tax agents 48 can be integrated with the merchant's e-commerce engine/server 84 for automatic activation during a network 46 taxable transaction, and/or for periodic transfer of tax transaction data obtained from taxable transactions completed previous to the transfer.

The foregoing description of preferred embodiments of the present invention has been provided for the purposes of illustration and description. It is not intended to be exhaustive or to limit the invention to the precise forms disclosed herein. Modifications and variations commensurate with the description herein will be apparent to those skilled in the art and are intended to be within the scope of the present invention to the extent permitted by the relevant art. The embodiments provided are for enabling others skilled in the art to understand the invention, its various embodiments and modifications as are suited for uses contemplated. It is intended that the scope of the invention be defined by the following claims and their equivalents.

APPENDIX A

The present invention uses a technique called "business rules" that offers a merchant the ability to tailor the functionality of the network taxation system 32 to their particular needs. There is a correspondence between each particular business rule and the way the system will operate for a specific purpose. For example, a merchant may choose a business rule indicating that address verification should always be performed on any sales transaction performed by the present invention. If such a business rule is not selected or another business rule is selected, then the merchant may or may not receive the results of address verification depending on the particulars of the sale transaction data provided to the network taxation system 32.

The business rules are built as a set and stored in a single record using the merchant's assigned identification (i.e., a merchant number) and a date and time the rules take effect. In one embodiment, business rules are built and stored as a set, wherein individual business rules cannot be changed. That is, to change one or more of a merchant's declared business rules, a new business rule set or record containing the following must generated: (a) the desired business rule changes, (b) a copy of any other unchanged business rules, (c) the date and time the new business rule set should become effective. Up to the date and time the new business rules take effect, the merchant can delete the new business rule record. For each merchant, each business rule set that have ever been in effect for the merchant is archived (in the tax audit archive 476) so that if there is a need to understand why the network taxation system 32 operated in a particular way on one or more transactions, the business rules set used are available for inspection.

The intent is to provide a merchant with a sufficiently rich collection of selectable predetermined business rules so that substantially any tax related business practice that a merchant may perform can be accommodated by business rules. Additionally, it is an aspect of the present invention to include, in at least some embodiments of the invention "taxation rules" for the tax authorities that are analogous to the business rules for the merchants. That is, each tax authority may input to the present invention tax criteria data indicating under what conditions certain taxes and/or tax rates are to be applied. Note that such conditions are captured to some extent in every embodiment of the invention in the tax criteria database 404. However, as more varied tax authorities and tax applicability criteria are incorporated into an embodiment of the invention, the processing for business rules may be duplicated for the taxation rules. Accordingly, embodiments of the invention may include taxation rule evaluators that are analogous to the business tax rule evaluator. The following categories of business rules may be included in embodiments of the invention:

1. Address verification business rules: These rules provide a merchant with options related to the purchase of the results of the full address verification the network taxation system 32 may perform on sale transaction data. The merchant may wish to acquire this information to ensure that the sale has the best chance of being received and reducing shipment returns. For example, the returned to the merchant may be address data including a Zip Code + 4 enhancement, and the GeoCode, and/or a combination of State, County and optionally City FIPS codes.

Three business rules may be provided here: (a) always return address verification and enhancement, (b) never return address verification and enhancement, and (c) return address verification and enhancement only when explicitly requested.

2. Address failure tax calculation business rules: These rules provide the merchant with options regarding performing tax calculations on sale transaction data where the full address verification fails.

The business rules here are: (a) reject the transaction and perform no taxation; this allows the merchant to request a valid address, (b) perform tax calculation using any valid address data such as any city, state and zip code combination. Note that several iterations of lookups can be performed, each less accurate than it's predecessors.

APPENDIX A-continued (i)    City name, State code and 5 position Zip Code can result in a pure GeoCode
   (ii)   City name, State code and 5 position Zip Code can result in a likely GeoCode. Note that this differs from (i) in that in case (i). the match is a true match, while in the present case, the match is using a table supplied by a tax rate supplier and the record match indicates that this is the default geo-code which means that part of the city, state and zip code (5 positions) falls outside of this geo-code but the majority of the population is within the geo-code, thus "default" and not exact.
   (iii)  State code and 5 position zip code can result in a likely geo-code
   (iv)   5 position zip code can result in a less likely geo-code
   (v)    Use state code to provide at least state taxation 3. Tax Calculation business rules: Provides the merchant with options related to Tax Calculation processing.

The business rules here are as follows: (a) always perform Tax Calculation, (b) never perform Tax Calculation; chosen by merchants seeking Address Verification only, and (c) Optional. Perform Tax Calculation on transactions only when requested.

4. Tax Calculation Method business rules: Allows the merchant to decide if Tax Calculation will be performed using transaction detail or summary information.

The business rules here are as follows: (a) Order Total. The merchant supplies a total amount for the order. Taxes are calculated on this amount, (b) line Items. The merchant supplies full transaction details for use in Tax Calculation.

5. Tax Calculation Results business rules: The results of a Tax Calculation can be reported to the merchant in detail or in aggregate. If the "Total taxes only" option is selected, only the total tax levied is returned. If the "Total Tax with breakdowns" is requested, each Tax Authority levying taxation is identified by Name (i.e. Colorado) and Type (i.e. State, Local, etc.) and the tax levied. In addition, each Line Item (if appropriate) is cross-referenced for taxability by Tax Authority Type.

The business rules here are as follows: (a) Total taxes only, and (b) Total tax with breakdowns 6. Collect voluntary taxes business rules: This business rule allows the merchant to select the degree to which they participate in taxation. Merchants without nexus for Tax Authority(s) are not required to collect Sales and Use taxes when selling to addresses within the Tax Authority's jurisdiction today. However, there are compelling reasons why a merchant may choose to voluntarily collect some or all of these taxes The business rules here are as follows: (a) Do not collect voluntary taxes. Uses the merchant's locations to determine Tax Authority nexus, (b) Collect all taxes. Apply Use tax of Tax Authorities' the merchant does not have Nexus with, (c) Collect taxes for all U.S. States and any Tax Authorities the state collects on behalf of, and (d) Collect taxes for States (and all Tax Authorities within the State) that esalestax.com has agreements with for fully collection and reporting processing.

7. Automatic Completion business rules: There are two business rules here: (a) Automatic completion which causes tax calculations to be finalized in a single step as described with reference to FIG. 11 and its description, (b) the merchant must explicitly send a request to make "Final" status any tax calculation determined. Accordingly, depending on other business rules, such finalized tax calculations may be then collected by the present invention, or merely returned to the merchant. In the latter case, it is the responsibility of the merchant to thent remit its taxes to the proper tax authorities.

8. Bill To business rules: The business rules here are intended for merchants that act as a network commerce gateway for other merchants. Such gateway merchants will have the option to act as a consolidator or single point of access to the present invention on behalf of their clients. Under these conditions, the network taxation system 32 will offer a billing option that allows it to wholesale its services to the gateway merchants affording them a lower cost for the service which they can mark up to their clients. Services requested by a gateway's customers would be billed to the gateway with sufficient detail to allow the gateway to bill its customers. This is the role that companies such as Credit Card Authorization processors could take. Thus, the services of the network taxation system 32 are billed to the "Gateway" merchant or the individual merchant based upon the business rule selected. In all cases, the monies for tax collection

APPENDIX A-continued are the responsibility of the individual merchant, not the "Gateway" merchant.

The remaining business rules are used to determine taxability of Shipping Charges imposed by a merchant:

9. Shipping Stated Separately business rules: The rules here are: (a) Indicates the merchant reports Shipping Charges separately on the invoice to the customer, (b) Indicates the merchant does not report Shipping Charges separately on the invoice to the customer.
10. Handling Stated Separately business rules: The rules here are: (a) Indicates the merchant reports Handling Charges separately on the invoice to the customer, (b) Indicates the merchant does not report Handling Charges separately on the invoice to the customer.
11. Goods not sold Shipped Price business rules: The rules here are: (a) Indicates the shipping cost of products is built into the price, (b) Indicates the shipping cost of products is not built into the price.
12. Shipping is for Cost only business rules: The rules here are: (a) Indicates Shipping Charges incurred by the purchaser reflect the Merchant's actual cost, (b) Indicates Shipping Charges incurred by the purchaser do not reflect the Merchant's actual cost.
13. Shipped directly to purchaser business rules: The rules here are: (a) Indicates purchases are always shipped to the purchaser as opposed to shipping to other locations such as gift recipients, (b) Indicates purchases are not always shipped to the purchaser as opposed to shipping to other locations such as gift recipients.
14. Shipped via Common Carrier business rules: The rules here are: (a) indicates the Merchant uses a common carrier for its shipping business, (b) indicates the Merchant does not use a common carrier for its shipping business.
15. Shipped via Contract Carrier business rules: The rules here are: (a) Indicates the Merchant uses a company that it directly contracts to handle shipping, in essence making the Merchant the shipper, (b) Indicates the Merchant does not use a company that it directly contracts to handle shipping, in essence making the Merchant the shipper.
16. Shipped using Vendor Equip business rules: The rules here are: (a) Indicates the Merchant does its own shipping using its own equipment, (b) Indicates the Merchant does not perform its own shipping using its own equipment.
17. Shipped FOB Origin business rules: The rules here are: (a) Indicates the Purchaser is charged for shipping from a location that is not owned or operated by the Merchant as occurs in the automobile industry, (b) Indicates the Purchaser is not charged for shipping from a location that is not owned or operated by the Merchant as occurs in the automobile industry.
18. Shipped FOB Destination business rules: The rules here are: (a) Indicates the Merchant is charging for shipping to a location designated by the purchaser. As might occur for shipping to a job site or temporary location, (b) Indicates the Merchant is not charging for shipping to a location designated by the purchaser.
19. FOB is purchaser option business rules: The rules here are: (a) Indicates the Merchant offers shipping options that the Purchaser can choose among, (b) Indicates the Merchant does not offer shipping options that the Purchaser can choose among.
20. Proof Vendor is Ship Agent business rules: The rules here are: (a) Indicates the Merchant is directly involved in the delivery of the goods or services to the purchaser. Some merchants act as agents accepting orders from purchasers that are forwarded to another company for fulfillment, (b) Indicates the Merchant is not directly involved in the delivery of the goods or services to the purchaser. Some merchants act as agents accepting orders from purchasers that are forwarded to another company for fulfillment.
21. Shipped from Vendor location business rules: The rules here are: (a) Indicates the Merchant is warehousing and distributing goods from a location that establishes nexus for the Merchant, (b) Indicates the Merchant is not warehousing and distributing goods from a location that establishes nexus for the Merchant.
22. Shipping is purchaser option business rules: The rules here are: (a) Indicates the purchaser has the option of having the purchase shipped as in the case of a good that the purchaser could pick-up from a merchant location but chooses to have shipped, (b) Indicates the purchaser does not have the option of having the purchase shipped as in the case of a good that the purchaser could pick-up from a merchant location but chooses to have shipped.

APPENDIX B

Each tax authority for which the present invention can evaluate and calculate taxes requires extensive data to be specified.

The following data is captured and retained for each tax authority:

1. Tax code: Each tax authority may impose one or more taxes. For example "Sales Tax" and "Use Tax" are separate taxes that a can be assessed. In general, taxes assessed by a tax authority are mutually exclusive. That is, if the Sales Tax is applied, the Use Tax is not. Other taxes may be assessed that are specifically designated to charge taxes differently based on product groupings such as a restaurant and bar tax that is imposed in lieu of a sales tax or a category of products generally associated with a class of merchandise.
2. Requires Nexus To Apply: A distinction that is applied to a tax code as defined hereinabove. The fact that nexus is required to assess a tax code so designated indicates that the tax applies to merchant's with physical presence to the tax authority imposing the tax and that the transaction took place within the tax authority's jurisdiction that is imposing the tax.
3. Tax Rate Effective Date: Each tax code has one or more instances of tax rate data. Each tax rate data instance becomes effective on a date as specified by the law by which was enacted. This date is equally valid as a future date as well as a current or past date and is used to identify the appropriate tax rate to apply to a transaction based upon the transaction date.
4. Tax Rate Expiration Date: Just as a tax code can have a tax rate data instance that becomes effective on a date in the future so a tax rate data instance can be set to expire on a date. Special taxes (i.e. bond repayment, stadium construction taxes, etc.) in particular use this date for ensuring that a tax is only collected for the duration that the enacting document provides.
5. Reporting Location ID: Can be an identifier that a tax authority assigns to uniquely identify data when more than one tax authorities' taxes are reported on a common document as occurs with (United States) States that collect taxes and receive reports that cover their own as well as county taxes, etc.
6. Tax Rate: a value, expressing a percentage of the accumulated amount for an order that this tax applies to, used to calculate all or part of the tax imposed, if this method of taxation is used for a particular tax.
7. Minimum Taxable Amount: A monetary value that reflects a minimum amount that a line item must be sold at BEFORE any taxation is applied. (i.e., if this field carried 100, then a given line item below that amount would not be taxed while an amount greater than that would be fully taxed according to an instance of the tax rate data as defined hereinabove).
8. Taxable Percentage: a value representing the percentage of a line item that is taxable (i.e. if this amount is greater than zero, the value of a line item is multiplied by this value and the intermediate result is then divided by 100 and the result is the amount on which a tax rate from an instance of tax rate data, as defined hereinabove, is applied).
9. Maximum Taxable Amount: a value representing the maximum value of a line item, or an individual item within a line item, that will be taxed at a tax rate from an instance of tax rate data, as defined hereinabove. Should the amount of a line item (or the price of a single item sold on a line item as derived by dividing extended price by the order quantity, both data elements provided by the merchant with a transaction when line items are required per business rules, see above) exceed this value, the remaining value over the amount in this field, or none of the amount if the value of this field is zero, is taxed at the Over Maximum Tax Rate, as defined hereinbelow.
10. Maximum per item: An indicator signifying whether the value in Maximum Taxable Amount, as defined hereinabove, applies to a line item at its extended price (where extended price equals the merchant specified order quantity multiplied by the merchant's product price and is a value the merchant provides with a transaction line item when line items are required per

APPENDIX B-continued business rules, see above) or to the price of an individual item sold on the line item (as derived, see definition in Maximum Taxable Amount hereinabove).

11. Over Maximum Tax Rate: a value, expressing a percentage of the accumulated amount of line items and/or individual products that exceed the amount, as defined in Maximum Taxable Amount, as defined hereinabove, used to calculate all or part of the tax imposed, if this method of taxation is used for a particular tax code.
12. Minimum Tax Collected: a value representing the minimum amount that any tax calculation for this tax code for a given transaction must total, otherwise this amount becomes the tax imposed.
13. Maximum Tax Collected: a value representing the maximum amount that any tax calculation for this tax code for a given transaction can total, otherwise this amount becomes the tax imposed.
14. Rounding Method: a value that determines how part values are treated when calculating tax to be imposed. The methods are: Standard (=>.5 + 1); Truncated (all decimals values are dropped); Round up (all decimal values >.0, +1).
15. Override County Tax: a Boolean value designating whether or not this tax code overrides a higher tax authority's (specifically a county's) tax rate in an instance of tax rate data.
16. Override County Tax Rate: a tax rate (from an instance of tax rate data as previously defined hereinabove) that supercedes a higher authority's (specifically a county's) tax rate.
17. Override State Tax: a Boolean value designating whether or not this tax code overrides a higher tax authority's (specifically a state's) tax rate.
18. Override State Tax Rate: a tax rate as previously defined hereinabove that supercedes a higher authority's (specifically a state's) tax rate.
19. Fee Amount: a value that can be applied as a tax either as an addition to the tax calculated from a tax rate (from an instance of tax rate data as defined hereinabove), or in lieu of such a tax rate.
20. Fee Amount Unit Type: an indicator that determines how the Fee Amount, as defined hereinabove, is applied to produce a tax amount. For example, this value could indicate that the Fee Amount is applied on a per item (quantity as supplied by the merchant for a transaction line item) basis as in a gasoline excise tax or on the transaction, as in a surcharge as in.an airport landing fee assessed on each airline ticket issued.
21. From Geocode: a Geocode (previously defined as a FIPS (Federal Information Processing System)) that defines the beginning of a range of such values that define all or a portion of a jurisdictional boundary for a tax authority.
22. Thru Geocode: a Geocode (as previously defined) that defines the end of a range of such values that define all or a portion of a jurisdictional boundary for a tax authority.
23. Product Code: a value that is a composite of three (3) values: a product section, product category and product code. In the circumstance used for tax authorities, wildcarding is used for all, some or none of the last two (2) components, product category and product code. Using a wildcard based approach, product codes are used to identify individual or groups of products that are explicitly deemed tax exempt or taxable for a given tax authority tax code.
24. Taxability: a value that when combined with the product code, as defined hereinabove, identifies the individual product or group of products as taxable or tax exempt.

What is claimed is:

1. In a system involved with the collection of taxes related to at least one of sales of goods and services that includes a plurality of customer computers including a first customer computer, a plurality of merchant computers including a first merchant computer associated with a first merchant having a first merchant account, a plurality of merchant bank computers including a first merchant bank computer, a plurality of tax authority designated computers including a first tax authority designated computer associated with a first tax authority having a first tax authority account, and one or more communication networks for enabling communications among the customer computers and the merchant computers and for enabling communications among the merchant computers and the merchant bank computers, a control system that performs the following operations communicates with each of the plurality of merchant computers using the one or more communication networks;

communicates with each of the plurality of merchant bank computers using the one or more communication networks;

communicates with each of the plurality of tax authority designated computers using the one or more communication networks;

stores debit information related to authorized debits, wherein each of the authorized debits is for debiting a corresponding one of the plurality of merchant banks;

stores credit information related to providing credits to each of the plurality of tax authority designated computers;

stores merchant information related to each of the plurality of merchants including identities of the merchants;

stores tax authority information related to each of the plurality of tax authorities including identities of the tax authorities;

receives, from each of the plurality of merchant computers, transaction information related to a taxable transaction between the merchant associated with the merchant computer, and another party to the transaction associated with some one of the customer computers, including first transaction information received from the first merchant computer during a same time the first transaction is conducted and said first transaction information including a digital certification for the first merchant for verifying that the first merchant is involved with the, first transaction;

debits at least the first merchant bank computer in a first tax amount related to said first transaction information;

credits said first tax amount to the first tax authority designated computer; and provides generated reports to the tax authorities associated with the plurality of tax authority designated computers;

wherein related to the first transaction said control system:

validates or invalidates address information associated with the another party to the transaction, said validating invalidating using business rules of the first merchant and includes:

ascertaining whether said first merchant's business rules allow for processing of partial address information of the another party to the transaction and, if so, determining if there is a more coarse address processing available and, if so, processing said partial address of the another party to the transaction; and ascertaining whether said first merchant's business rules allow for substituting another address of the another party to the transaction and, if so, determining if there is another address of the another party to the transaction that can be used and, if so, creating a substitute address record of the another party to the transaction; and determines one or more tax authorities, including at least one of the plurality of the tax authorities, that has a nexus for the address information of the another party to the transaction when it is validated.

2. The control system, as claimed in claim 1, including a main tax gateway and at least a first distributed tax gateway in communication therewith, said main tax gateway storing said debit information, storing said credit information, storing said merchant information and storing said tax authority information.

3. The control system, as claimed in claim 2, wherein:
said main tax gateway being used in debiting the first merchant bank computer in the first tax amount and being used in crediting the first tax amount to the first tax authority designated computer and said main tax gateway further includes:
a merchant related data store including, for each of a plurality of merchants having a corresponding one of the merchant computers, merchant bank information identifying the merchant's bank, wherein there is first and second merchant bank information identifying, respectively, the first merchant bank and a second merchant bank for a second merchant, wherein the first and second merchant banks are different, and wherein said merchant related data store is accessed for performing said debits operation.

4. The control system, as claimed in claim 2, wherein:
said first distributed tax gateway is used in receiving said first transaction information.

5. The control system, as claimed in claim 2, wherein:
said first distributed tax gateway includes a first distributed controlling subsystem and in which at least one of said first distributed controlling subsystem and the first merchant computer calculates said first tax amount using a tax collection agent.

6. The control system, as claimed in claim 2, wherein:
said main tax gateway stores first merchant certification information related to certifying communications as being received from the first merchant computer and stores first tax authority certification information related to certifying communications as being received from the first tax authority designated computer.

7. The control system, as claimed in claim 2, wherein:
said main tax subsystem stores first merchant validating information related to validating the identification of the first merchant and stores the authority validating information related to validating the identity of the first tax authority.

8. The control system, as claimed in claim 2, wherein:
said main tax gateway stores information related to requirements as to when the plurality of tax authority designated computers are to be credited with said first tax amount and stores information related to correlating the identity of the first merchant with the identity of the first merchant bank.

9. The control system, as claimed in claim 2, further including:
a plurality of distributed tax gateways different from said first distributed tax gateway and with said plurality of distributed tax gateways and said first distributed tax gateway in communication with said main tax gateway.

10. The control system of claim 2, wherein said main tax gateway includes a tax transaction management system for generating electronic bank to bank transfer notes for transferring funds between the first merchant bank and a bank designated for receiving taxes to be paid by the first merchant.

11. The control system of claim 10, wherein said tax transaction management system generates said electronic bank to bank transfer notes according to an automated clearing house (ACH) procedure provided by a governmental agency.

12. The control system, as claimed in claim 1, wherein:
the one or more communication networks includes the Internet.

13. The control system of claim 1 that includes a network interface for receiving, during the first transaction, a request for determining a tax on the first transaction, and providing a responsive network transmission to the first merchant computer prior to finalizing the first transaction with the first customer.

14. The control system of claim 13 that includes a merchant interaction control system that communicates with at least one of: (a) a merchant enrollment system for enrolling merchants for receiving taxation related information in response to transaction information merchants supplied to said control system; (b) a tax computing engine for determining a tax on the first transaction, and (c) a merchant permissions system for authenticating that the first transaction is from the first merchant.

15. The control system of claim 1, wherein said control system receives the first transaction information without the first merchant computer receiving a request for transmitting the first transaction information to said control system.

16. The control system of claim 1, wherein said control system assesses which, if any, of the tax authorities having the nexus is to be considered for taxation using said business rules of the first merchant.

17. In a system involved with the collection of taxes related to at least one of sales of goods and services that includes a plurality of merchant computers including a first merchant computer associated with a first merchant having a first merchant account, a plurality of merchant bank computers including a first merchant bank computer associated with the first merchant, a plurality of tax authority designated computers including a first tax authority designated computer associated with a first tax authority having a first tax authority account, and one or more communication networks for enabling communications at least among the merchant computers and the merchant bank computers,
a control system that performs the following operations:
communicates with each of the plurality of merchant computers using the one or more communication networks;
communicates with each of the plurality of merchant bank computers using the one or more communication networks;
communicates with each of the plurality of tax authority designated computers using the one or more communication networks;
stores merchant information related to each of the plurality of merchants including identities of the merchants;
stores tax authority information related to each of the plurality of tax authorities including identities of the tax authorities;
receives at least transaction information related to a first transaction between the first merchant and another party;
wherein said control system acts according to first business rules obtained from the first merchant and uses nexus information of the first merchant, said first business rules indicating services that said control system is to perform for the first merchant, said nexus information indicating where the first merchant has a physical presence,
(1) said first business rules being related to a tax method to be used and being selected by the first merchant from at least the following business rules:

(a) perform tax calculations for the tax authority selected by the merchant, (b) perform tax calculations for the tax authority selected by the merchant if specified in a request with sale transaction data from the merchant, (c) calculate the tax(es) on a total for the corresponding customer purchase, and (d) calculate the tax(es) for each line item of a corresponding customer purchase separately; and (2) said first business rules being related to taxes to collect and being selected by the first merchant from at least the following business rules:

(a) do not collect taxes for any tax authorities, (b) collect all taxes that can be determined using the control system, (c) collect taxes for states in the United States, (d) collect taxes for tax authorities for which states also collect taxes on their behalf, and (e) collect taxes for those tax authorities in which there is an agreement between said control system and said tax authorities for accepting taxes on behalf of the merchant via an automatic clearing house (ACH) electronic transfer of funds; and (3) said first business rules being related to shipping and being selected by the first merchant from at least the following business rules:

(a) shipping costs are itemized separately on sales orders, (b) shipping costs are not itemized separately on sales orders, (c) a product sales price includes shipping charges, and (d) product sales price does not include shipping charges.

18. In a system involved with the collection of taxes related to at least one of sales of goods and services that includes a network interface, a plurality of customer computers including a first customer computer, a plurality of merchant computers including a first merchant computer associated with a first merchant having a first merchant account, a plurality of merchant bank computers including a first merchant bank computer, a plurality of tax authority designated computers including a first tax authority designated computer associated with a first tax authority having a first tax authority account, and one or more communication networks for enabling communications among the customer computers and the merchant computers and for enabling communications among the merchant computers and the merchant bank computers, a control system that performs the following operations:

communicates with each of the plurality of merchant computers using the one or more communication networks;

communicates with each of the plurality of merchant bank computers using the one or more communication networks;

communicates with each of the plurality of tax authority designated computers using the one or more communication networks;

stores debit information related to authorized debits, wherein each of the authorized debits is for debiting a corresponding one of the plurality of merchant banks;

stores credit information related to providing credits to each of the plurality of tax authority designated computers;

stores merchant information related to each of the plurality of merchants including identities of the merchants;

stores tax authority information related to each of the plurality of tax authorities including identities of the tax authorities;

receives, from each of the plurality of merchant computers, transaction information related to a taxable transaction between the merchant associated with the merchant computer, and another party to the transaction associated with some one of the customer computers, including first transaction information received from the first merchant computer during a same time said first transaction is conducted, said network interface receiving, during said first transaction, a request for determining a tax on said first transaction, and providing a responsive network transmission to the first merchant computer prior to finalizing said first transaction with a first customer;

debits at least the first merchant bank computer in a first tax amount related to said first transaction information;

credits said first tax amount to the first tax authority designated computer; and provides generated reports to the tax authorities associated with the plurality of tax authority designated computers;

wherein said control system uses first and second nexus information of the first merchant and a second merchant, respectively, indicating where the first and second merchant has a physical presence and said control system uses a first set of business rules obtained from the first merchant and a second set of business rules obtained from the second merchant, said first set of business rules being used in determining a response to receiving said first transaction information, said first set of business rules being selected by the first merchant from a first number of business rules related to a tax method to be used, a second number of business rules related to taxes to collect, and a third number of business rules related to shipping, said first set of business rules comprised of at least one of said first number of business rules, at least one of said second number of business rules and at least one of said third number of business rules, said second set of business rules being selected by the second merchant from said first, second, and third numbers of business rules, said second set of business rules comprised of at least one of said first number of business rules, at least one of said second number of business rules, and at least one of said third number of business rules, and in which a plurality of said first set of business rules is different than said second set of business rules when said first nexus information is the same as said second nexus information, said first set of business rules selected by the first merchant and said second set of business rules selected by the second merchant being used in determining how said system calculates taxes for the first and second merchants, respectively, being used in identifying tax authorities, if any, for which taxes are to be collected and what taxes, if any, are to be collected, and in which said first set of business rules selected by the first merchant includes: perform tax calculations for the tax authority selected by the first merchant if specified in a request with sale transaction data from the first merchant, collect taxes for those tax authorities in which there is an agreement between said control system and said tax authorities for accepting taxes on behalf of the merchant via an automatic clearing house (ACH) electronic transfer of funds, and itemize shipping costs separately on sales orders; and the second set of business rules selected by the second merchant includes: calculate the tax(es) on a total for the corresponding customer purchase, do not collect taxes for any tax authorities, and shipping costs are not itemized separately on sales orders.

19. The control system of claim 17, wherein said first business rules are provided to said control system as part of enrollment of the first merchant.

20. The control system of claim 17, wherein said control system verifies that the first merchant is enrolled when the first merchant attempts to access said control system.

21. The control system of claim 17, wherein said control system performs verification for the first merchant by retrieving an identification record of the first merchant.

22. The control system of claim 17, wherein said nexus information is used to determine which, if any, of the plurality of tax authorities the first merchant is to obtain taxes.

* * * * *

UNITED STATES PATENT AND TRADEMARK OFFICE
CERTIFICATE OF CORRECTION

PATENT NO. : 6,993,502 B1
APPLICATION NO. : 09/710443
DATED : January 31, 2006
INVENTOR(S) : Gryglewicz et al.

It is certified that error appears in the above-identified patent and that said Letters Patent is hereby corrected as shown below:

At column 1, line 50, after the words "Supreme Court" and before the word "addressed," please insert the words --provided for determining that a use tax on a purchase via, e.g., the internet is now proper may be--.

At column 5, line 51, please delete the term "$50_I$" and replace with --$50_1$--

At column 5, line 58, please delete the term "$34_I$" and replace with --$34_1$--.

At column, 6, lines 31-32, please delete "merchant nodes 50 and 501, 50M" and replace with --merchant nodes 50, and $50_M$--.

At col. 25, line 54, plase delete the word "arc" and replace with --are--.

At col. 44, line 4, plase insert a ":" after the word "operations"

Col. 44, at lines 47-48, plase delete "validating invalidating" and replace with --validating or invalidating--.

Signed and Sealed this

Twenty-fifth Day of July, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,993,502 B1 | Page 1 of 1 |
| APPLICATION NO. | : 09/710443 | |
| DATED | : January 31, 2006 | |
| INVENTOR(S) | : Gryglewicz et al. | |

It is certified that error appears in the above-identified patent and that said Letters Patent is hereby corrected as shown below:

At column 1, line 50, after the words "Supreme Court" and before the word "addressed," please insert the words --provided for determining that a use tax on a purchase via, e.g., the internet is now proper may be--.

At column 5, line 51, please delete the term "$50_I$" and replace with --$50_1$--

At column 5, line 58, please delete the term "$34_I$" and replace with --$34_1$--.

At column, 6, lines 31-32, please delete "merchant nodes 50 and 501, 50M" and replace with --merchant nodes $50_1$ and $50_M$--.

At col. 25, line 54, plase delete the word "arc" and replace with --are--.

At col. 44, line 4, plase insert a ":" after the word "operations"

Col. 44, at lines 47-48, plase delete "validating invalidating" and replace with --validating or invalidating--.

This certificate supersedes Certificate of Correction issued July 25, 2006.

Signed and Sealed this

Twenty-eighth Day of November, 2006

JON W. DUDAS
*Director of the United States Patent and Trademark Office*